US010704439B2

(12) United States Patent
Imai et al.

(10) Patent No.: US 10,704,439 B2
(45) Date of Patent: Jul. 7, 2020

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi (JP)

(72) Inventors: Daichi Imai, Sunto-gun (JP); Hiroshi Kobayashi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 36 days.

(21) Appl. No.: 16/207,891

(22) Filed: Dec. 3, 2018

(65) Prior Publication Data

US 2019/0195101 A1  Jun. 27, 2019

(30) Foreign Application Priority Data

Dec. 27, 2017 (JP) ................. 2017-251133

(51) Int. Cl.
*F01N 3/20* (2006.01)
*F01N 3/08* (2006.01)
(Continued)

(52) U.S. Cl.
CPC ......... *F01N 3/0814* (2013.01); *F01N 3/0842* (2013.01); *F01N 3/0871* (2013.01);
(Continued)

(58) Field of Classification Search
CPC . B01D 53/9422; F01N 3/0814; F01N 3/0842; F01N 3/0871; F01N 3/206;
(Continued)

(56) References Cited

U.S. PATENT DOCUMENTS

| 6,038,853 A | 3/2000 | Penetrante et al. |
| 8,650,863 B2 * | 2/2014 | Sobue ............... F01N 3/0814 60/286 |

(Continued)

FOREIGN PATENT DOCUMENTS

| EP | 3 073 078 A2 | 9/2016 |
| JP | 2005-163590 | 6/2005 |
| JP | 2016-186239 | 10/2016 |

OTHER PUBLICATIONS

Office Action dated Jan. 24, 2020 for U.S. Appl. No. 16/210,012.

*Primary Examiner* — Jonathan R Matthias
(74) *Attorney, Agent, or Firm* — Oblon, McClelland, Maier & Neustadt, L.L.P.

(57) ABSTRACT

An exhaust gas purification apparatus for an internal combustion engine includes: a controller comprising at least one processor is configured to carry out rich spike; wherein the controller carries out supply control to supply a reducing agent to a post-stage catalyst, wherein in cases where a temperature of an NSR catalyst becomes less than a predetermined determination temperature in at least a part of a determination period of time, the controller carries out the supply control according to the execution of current rich spike; wherein the controller controls such that in cases where the storage amount of NOx is the same, an amount of supply of the reducing agent in the supply control is made larger as a period of time in which the temperature of the NSR catalyst becomes less than the predetermined determination temperature in the determination period of time becomes longer.

5 Claims, 16 Drawing Sheets

(51) Int. Cl.
    *F01N 13/00*    (2010.01)
    *F01N 9/00*     (2006.01)
    *F02D 41/02*    (2006.01)
    *F02D 41/14*    (2006.01)

(52) U.S. Cl.
    CPC .............. *F01N 3/208* (2013.01); *F01N 9/00* (2013.01); *F01N 13/009* (2014.06); *F02D 41/0275* (2013.01); *F02D 41/1454* (2013.01); *F02D 41/1475* (2013.01); *F01N 2430/06* (2013.01); *F01N 2560/06* (2013.01); *F01N 2610/02* (2013.01); *F01N 2900/0422* (2013.01); *F01N 2900/1602* (2013.01); *F01N 2900/1614* (2013.01); *F01N 2900/1812* (2013.01); *F02D 2200/0806* (2013.01)

(58) Field of Classification Search
    CPC ........... F01N 2560/026; F01N 2570/14; F01N 2900/1614
    See application file for complete search history.

(56) References Cited

U.S. PATENT DOCUMENTS

| | | |
|---|---|---|
| 9,010,090 B2 | 4/2015 | Basaiji et al. |
| 2003/0114300 A1 | 6/2003 | Twigg |
| 2005/0229589 A1* | 10/2005 | Murata ................. F01N 3/0871 60/286 |
| 2006/0137328 A1 | 6/2006 | Takeshima et al. |
| 2013/0259778 A1 | 10/2013 | Doering |
| 2015/0308363 A1* | 10/2015 | Choi ..................... F01N 3/2073 123/703 |
| 2019/0195102 A1 | 6/2019 | Imai et al. |
| 2019/0195103 A1 | 6/2019 | Kobayashi et al. |

\* cited by examiner

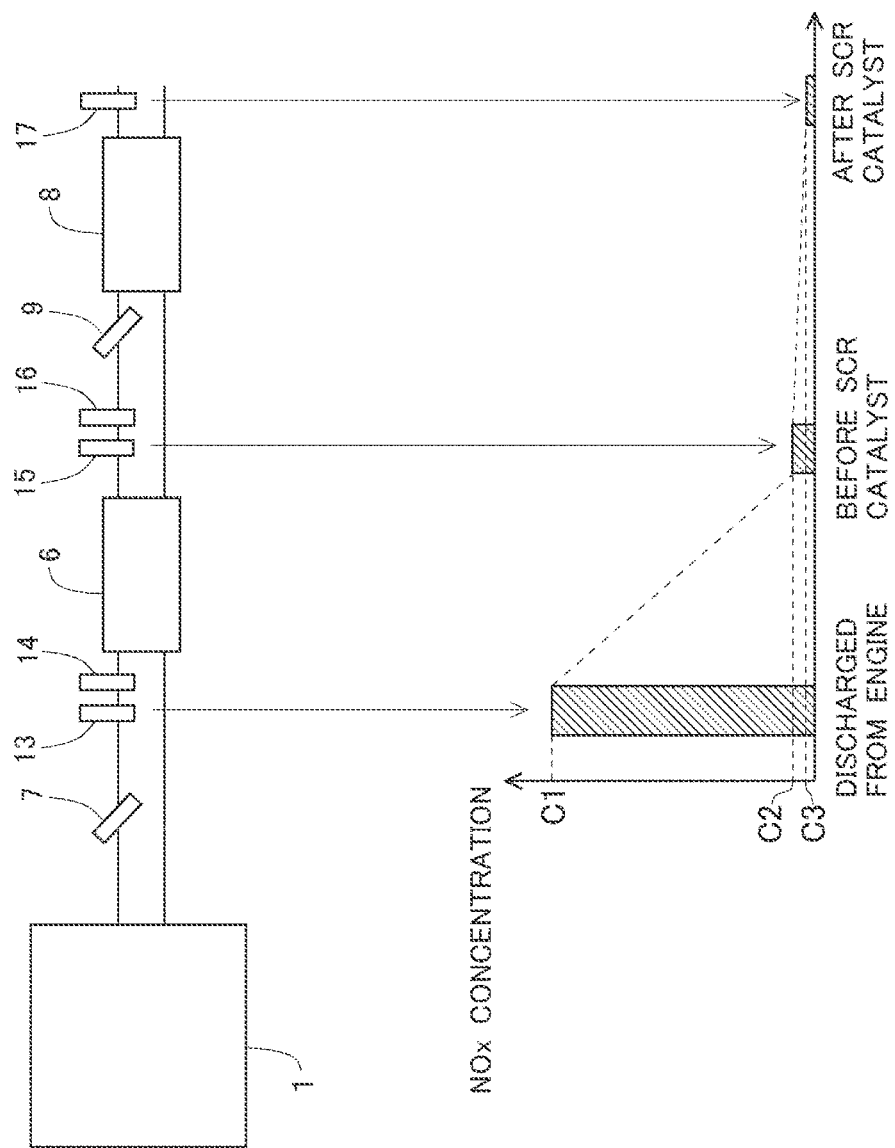

EXHAUST GAS PURIFICATION APPARATUS FOR AN INTERNAL COMBUSTION ENGINE

This application claims the benefit of Japanese Patent Application No. 2017-251133, filed on Dec. 27, 2017, which is hereby incorporated by reference herein in its entirety.

BACKGROUND

Technical Field

The present disclosure relates to an exhaust gas purification apparatus for an internal combustion engine.

Description of the Related Art

There has been known a technique in which an NOx storage reduction catalyst (hereinafter, sometimes also referred to as an "NSR catalyst") is arranged as an exhaust gas purification catalyst in an exhaust passage of an internal combustion engine which performs lean burn operation in which an air fuel ratio of a mixture is adjusted to a lean air fuel ratio higher than a stoichiometric air fuel ratio. The NSR catalyst has a function to store NOx in exhaust gas when the air fuel ratio of its ambient atmosphere is a lean air fuel ratio, as well as to reduce the NOx thus stored when the air fuel ratio of the ambient atmosphere is a rich air fuel ratio lower than the stoichiometric air fuel ratio and when a reducing agent exists. Here, note that in this description, the term "storage" is used as such including a mode of "adsorption".

Then, in the internal combustion engine which is provided with such an NSR catalyst, the NOx stored in the NSR catalyst is reduced by the execution of rich spike which temporarily changes the air fuel ratio of the exhaust gas from a lean air fuel ratio higher than the stoichiometric air fuel ratio to a rich air fuel ratio lower than the stoichiometric air fuel ratio.

In patent literature 1, there is disclosed a technique in which rich spike is carried out when an amount of NOx trapped by an NOx trap catalyst reaches a predetermined amount.

In addition, in patent literature 2, there is disclosed a technology in which in an exhaust gas purification control apparatus which carries out a rich spike operation in cases where an amount of NOx stored in an NSR catalyst exceeds a first threshold value, when the storage amount of NOx exceeds a second threshold value larger than the first threshold value, the rich spike operation is carried out at an air fuel ratio of the exhaust gas leaner than in the case where the storage amount of NOx is equal to or less than the second threshold value.

CITATION LIST

Patent Literature

Patent Literature 1: Japanese patent application laid-open publication No. 2005-163590
Patent Literature 2: Japanese patent application laid-open publication No. 2016-186239

SUMMARY

When rich spike is carried out, the NOx stored in the NSR catalyst (the stored NOx) is once released from a storage material possessed by the NSR catalyst, and is made to react with the reducing agent such as CO, HC, etc., in the presence of a precious metal catalyst possessed by the NSR catalyst. As a result, NOx is reduced to $N_2$ in the NSR catalyst. Here, it has been found that even if the amount of the stored catalyst (the storage amount of NOx) and the temperature of the NSR catalyst at the time when the rich spike is carried out are the same, ease of release when the stored NOx is released from the storage material by the rich spike changes resulting from a storage mode of the NOx in the NSR catalyst.

In addition, a part of the NOx released from the storage material by the rich spike may flow out from the NSR catalyst, without being reduced by the reducing agent. Stated in another way, even if the rich spike is carried out, a part of the stored NOx may be purged from the NSR catalyst, without being reduced.

Here, with the provision of a post-stage catalyst which is capable of reducing NOx and which is arranged at the downstream side of the NSR catalyst, the NOx purged from the NSR catalyst can be reduced by the post-stage catalyst. However, as mentioned above, in view of the fact that the ease of release of the stored NOx from the storage material changes resulting from the storage mode of the NOx in the NSR catalyst, even if the storage amount of NOx and the temperature of the NSR catalyst at the time when the rich spike is carried out are the same, the amount of NOx (the amount of purged NOx) purged from the NSR catalyst by the rich spike will be able to change resulting from the storage mode of the NOx in the NSR catalyst. Then, when the NOx purged from the NSR catalyst is made to be reduced by the post-stage catalyst, there is a fear that exhaust emissions may deteriorate if a difference in the amount of purged NOx resulting from the storage mode of the NOx is not taken into consideration.

The present disclosure has been made in view of the above-mentioned problems, and has for its object to suppress occurrence of a situation where exhaust emissions deteriorate due to NOx purged from an NSR catalyst as much as possible.

The present disclosure is directed to an exhaust gas purification apparatus for an internal combustion engine which performs lean burn operation, the apparatus may comprising: a first NOx storage reduction catalyst that is arranged in an exhaust passage of the internal combustion engine; a post-stage catalyst that is arranged in the exhaust passage at the downstream side of the first NOx storage reduction catalyst, and reduces NOx in an exhaust gas by a supplied reducing agent; a reducing agent supply device that is arranged in the exhaust passage between the first NOx storage reduction catalyst and the post-stage catalyst, and supplies the reducing agent into the exhaust passage; a controller comprising at least one processor is configured to carry out rich spike to temporarily change an air fuel ratio of an exhaust gas flowing into the first NOx storage reduction catalyst from a lean air fuel ratio higher than a stoichiometric air fuel ratio into a rich air fuel ratio lower than the stoichiometric air fuel ratio; wherein the controller carries out supply control to supply the reducing agent to the post-stage catalyst by using the reducing agent supply device; and the controller calculates a storage amount of NOx which is an amount of NOx stored in the first NOx storage reduction catalyst.

In such an exhaust gas purification apparatus, most of the NOx discharged from the internal combustion engine may be stored in the first NOx storage reduction catalyst (hereinafter, sometimes also referred to as an "NSR catalyst"). Then, when rich spike is carried out, the NOx stored in the first NSR catalyst (hereinafter, sometimes also referred to as "the stored NOx") can be reduced by the reducing agent such as CO, HC, etc., contained in the exhaust gas of a rich air fuel ratio. However, even if the rich spike is carried out, a part of the stored NOx may be purged from the first NSR catalyst, without being reduced.

Then, in the exhaust gas purification apparatus, even if NOx is purged from the first NSR catalyst by the rich spike, the NOx may be reduced by the post-stage catalyst arranged at the downstream side of the first NSR catalyst. Here, the post-stage catalyst is, for example, an NOx selective reduction catalyst which reduces the NOx in the exhaust gas by means of ammonia which is the reducing agent, or an NOx storage reduction catalyst which reduces the NOx in the exhaust gas by means of fuel which is the reducing agent.

Here, as a result of earnest study, the inventor of the subject application has newly found that even if the storage amount of NOx and the temperature of the first NSR catalyst at the time when rich spike is carried out are the same, the amount of NOx purged from the first NSR catalyst by the current rich spike may change due to the history of the temperature of the first NSR catalyst in a period of time from the completion of the execution of the last rich spike to a request for the execution of the current rich spike (hereinafter, sometimes also referred to as a "determination period of time"). According to this, in cases where the temperature of the first NSR catalyst is relatively low, NOx tends to be stored into a storage material possessed by the first NSR catalyst in a mode easy to be released therefrom (hereinafter, sometimes also referred to as a "first mode"). On the other hand, in cases where the temperature of the first NSR catalyst is relatively high, NOx tends to be stored into the storage material in a mode hard to be released therefrom (hereinafter, sometimes also referred to as a "second mode"). In this manner, the storage mode of the NOx in the first NSR catalyst changes according to the temperature history of the first NSR catalyst in the determination period of time.

Then, an amount of NOx purged from the first NSR catalyst by rich spike (hereinafter, referred to as an "amount of purged NOx") may change resulting from such a storage mode of NOx. Specifically, even if the storage amount of NOx is the same, the larger the amount of NOx of the first mode in the stored NOx, the larger the amount of purged NOx tends to become. In contrast to this, even if the storage amount of NOx is the same, the larger the amount of NOx of the second mode in the stored NOx, the smaller the amount of purged NOx tends to become. Then, when the NOx purged from the first NSR catalyst is made to be reduced by using the post-stage catalyst, there is a fear that exhaust emissions may deteriorate if such a situation is not taken into consideration.

Accordingly, in an exhaust gas purification apparatus for an internal combustion engine according to a first aspect of the present disclosure, in cases where the temperature of the first NOx storage reduction catalyst becomes less than a predetermined determination temperature in at least a part of the determination period of time, the controller may carry out the supply control according to the execution of the current rich spike. Moreover, in cases where the storage amount of NOx is the same, supply amount control may be carried out such that an amount of supply of the reducing agent in the supply control is made larger as a period of time in which the temperature of the first NOx storage reduction catalyst is less than the predetermined determination temperature becomes longer.

Here, the predetermined determination temperature is defined as a temperature at which NOx can become the second mode and can be stored into the first NSR catalyst, when the temperature of the first NSR catalyst becomes equal to or higher than the determination temperature. Here, note that the NOx already stored in the first NSR catalyst in the first mode may change into the second mode, when the temperature of the first NSR catalyst after the storage of the NOx becomes equal to or higher than the predetermined determination temperature. Accordingly, in the first NSR catalyst of which the temperature has become equal to or higher than the predetermined determination temperature, there is a tendency that the NOx is stored in the first NSR catalyst in the first mode. On the other hand, in the first NSR catalyst of which the temperature has become less than the predetermined determination temperature, there is a tendency that the NOx is stored in the first NSR catalyst in the second mode. Then, in cases where the temperature of the first NSR catalyst becomes less than the predetermined determination temperature in at least a part of the determination period of time, a part of the stored NOx will be purged from the first NSR catalyst when the rich spike is carried out. Accordingly, in this case, as mentioned above, the controller carries out the supply control according to the execution of the rich spike. With this, the NOx purged from the first NSR catalyst by the rich spike may be reduced in the post-stage catalyst by the reducing agent supplied by the supply control.

Then, the stored NOx of the first mode in the entire stored NOx becomes larger as a period of time in which the temperature of the first NSR catalyst becomes less than the predetermined determination temperature within the determination period of time (hereinafter, sometimes also referred to as a "catalyst low temperature period") is longer. Accordingly, even if the storage amount of NOx is the same, the amount of purged NOx becomes larger in the case where the catalyst low temperature period is long, in comparison with the case where it is short. Thus, the controller may control such that in cases where the storage amount of NOx is the same, the amount of supply of the reducing agent in the supply control carried out according to the execution of the rich spike is made larger as the catalyst low temperature period becomes longer. The control to make the amount of supply of the reducing agent larger in this manner is hereinafter referred to as "supply amount control". Then, the controller carries out this supply amount control, whereby the reducing agent in an amount corresponding to the amount of purged NOx will be supplied to the post-stage catalyst. For that reason, the NOx purged from the first NSR catalyst by the rich spike is reduced in an appropriate manner by the reducing agent in the post-stage catalyst. As a result of this, a situation where exhaust emissions deteriorate due to the NOx purged from the first NSR catalyst can be suppressed as much as possible.

In addition, the post-stage catalyst may be an NOx selective reduction catalyst that reduces the NOx in the exhaust gas by supplied ammonia. Then, the reducing agent supply device may supply a precursor of ammonia or ammonia, and in cases where the temperature of the first NOx storage reduction catalyst becomes less than the predetermined determination temperature in at least a part of the determination period of time from the completion of the execution of the last rich spike to the request for the execution of the current rich spike, the controller may carry out the supply control before the execution of the current rich spike. According to this, before NOx is purged from the first NSR catalyst by rich spike, an amount of adsorption of ammonia in the NOx selective reduction catalyst can be increased in advance. As a result, when NOx is actually purged from the first NSR catalyst by the rich spike, the NOx can be reduced in an appropriate manner in the NOx selective reduction catalyst.

Further, the controller may carry out the supply amount control so that the amount of adsorption of ammonia in the NOx selective reduction catalyst after the execution of the supply amount control becomes less than a slip development adsorption amount at which a slip of ammonia from the NOx selective reduction catalyst starts. According to this, the NOx purged from the first NSR catalyst by the rich spike can be reduced, while suppressing the slip of ammonia from the NOx selective reduction catalyst (SCR catalyst).

In addition, the post-stage catalyst may be a second NOx storage reduction catalyst that reduces the NOx in the exhaust gas by supplied fuel. Then, the reducing agent supply device supplies fuel, and in cases where the temperature of the first NOx storage reduction catalyst becomes less than the predetermined determination temperature in at least a part of the determination period of time from the completion of the execution of the last rich spike to the request for the execution of the current rich spike, the controller may carry out the supply control simultaneously with the execution of the current rich spike. As a result of this, the NOx purged from the first NSR catalyst by the rich spike can be reduced in an appropriate manner in the second NOx storage reduction catalyst.

Next, reference will be made to an exhaust gas purification apparatus for an internal combustion engine according to a second aspect of the present disclosure. It has been found that the NOx stored in the first NSR catalyst in the first mode described in the explanation of the above-mentioned first aspect of the present disclosure is nitrites, and that the nitrites are stored into the storage material of the first NSR catalyst by a relatively weak adsorption force. On the other hand, it has also been found that the NOx stored in the first NSR catalyst in the second mode is nitrates, and that the nitrates are stored into the storage material of the first NSR catalyst by an adsorption force which is stronger than that of the nitrites. Accordingly, when the stored NOx is released from the storage material of the first NSR catalyst by the rich spike, the nitrites stored in the storage material become easier to be released than the nitrates stored in the storage material.

In view of the above, when a ratio of the amount of the nitrates stored in the first NSR catalyst (hereinafter, sometimes also referred to as a "storage amount of nitrates") with respect to the storage amount of NOx is defined as a nitrate ratio, even if the storage amount of NOx is the same, the amount of purged NOx may become larger in the case where the rich spike is carried out in a state where the nitrate ratio is low, in comparison with the case where the rich spike is carried out in a state where the nitrate ratio is high.

Accordingly, the exhaust gas purification apparatus for an internal combustion engine according to the second aspect of the present disclosure may comprise: a first NOx storage reduction catalyst that is arranged in an exhaust passage of the internal combustion engine; a post-stage catalyst that is arranged in the exhaust passage at the downstream side of the first NOx storage reduction catalyst, and reduces NOx in an exhaust gas by a supplied reducing agent; a reducing agent supply device that is arranged in the exhaust passage between the first NOx storage reduction catalyst and the post-stage catalyst, and supplies the reducing agent into the exhaust passage; a controller comprising at least one processor is configured to carry out rich spike to temporarily change an air fuel ratio of an exhaust gas flowing into the first NOx storage reduction catalyst from a lean air fuel ratio higher than a stoichiometric air fuel ratio into a rich air fuel ratio lower than the stoichiometric air fuel ratio; wherein the controller carries out supply control to supply the reducing agent to the post-stage catalyst by using the reducing agent supply device; the controller calculates a storage amount of NOx which is an amount of NOx stored in the first NOx storage reduction catalyst; the controller that calculates, based on a temperature of the first NOx storage reduction catalyst, a storage amount of nitrates which is an amount of nitrates stored in the first NOx storage reduction catalyst; and the controller calculates a nitrate ratio, which is a ratio of the storage amount of nitrates with respect to the storage amount of NOx, based on the storage amount of NOx and the storage amount of nitrates. Then, in cases where the nitrate ratio is less than a predetermined determination ratio when the execution of the rich spike is requested, the controller may carry out the supply control according to the execution of the rich spike, and may control the amount of supply of the reducing agent in the supply control based on the nitrate ratio.

Here, whether NOx becomes easy to turn into nitrites and to be stored in the first NSR catalyst, or NOx becomes easy to turn into nitrates and to be stored in the first NSR catalyst, changes according to the temperature of the first NSR catalyst. Accordingly, the storage amount of nitrates will change according to the temperature of the first NSR catalyst. Then, in cases where the storage amount of NOx is the same, when the temperature of the first NSR catalyst becomes relatively low and the storage amount of nitrates is small, the nitrate ratio becomes lower in comparison with when the temperature of the first NSR catalyst is relatively high. For example, in the determination period of time described in the explanation of the above-mentioned first aspect of the present disclosure, in cases where the storage amount of NOx is the same, the nitrate ratio tends to become lower, as a period of time in which the temperature of the first NSR catalyst is relatively low becomes longer.

Then, in cases where the nitrate ratio is less than the predetermined determination ratio when the execution of the rich spike is requested, the controller may carry out the supply control according to the execution of the rich spike, and may control the amount of supply of the reducing agent in the supply control based on the nitrate ratio. Here, the predetermined determination ratio is defined as a ratio at which the NOx purged from the first NSR catalyst by the rich spike becomes extremely small, when the nitrate ratio becomes equal to or higher than the predetermined determination ratio. Then, in cases where the supply control is carried out according to the execution of the rich spike, the controller can make the amount of supply of the reducing agent in the supply control larger in the case where the nitrate ratio is low than in the case where it is high, even if the storage amount of NOx is the same. As a result of this, even in the case where the rich spike is carried out in a state where the nitrate ratio is low, the NOx purged from the first NSR catalyst by the rich spike can be reduced, as in the case where the rich spike is carried out in a state where the nitrate ratio is high. In other words, it becomes possible to suppress as much as possible occurrence of a situation where exhaust emissions deteriorate due to the NOx purged from the first NSR catalyst.

According to the present disclosure, a situation where exhaust emissions deteriorate due to the NOx purged from an NSR catalyst can be suppressed as much as possible.

BRIEF DESCRIPTION OF DRAWINGS

FIG. 2 is a view indicating a concentration of NOx in an exhaust gas which is discharged from the internal combustion engine and which is before flowing into a first NSR catalyst, a concentration of NOx in an exhaust gas which is after the first NSR catalyst and before an SCR catalyst, and a concentration of NOx in exhaust gas which is after the SCR catalyst.

DESCRIPTION OF THE EMBODIMENTS

Hereinafter, modes (or embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

First Embodiment

<Construction of Intake and Exhaust Systems of Internal Combustion Engine>

Figure 1:
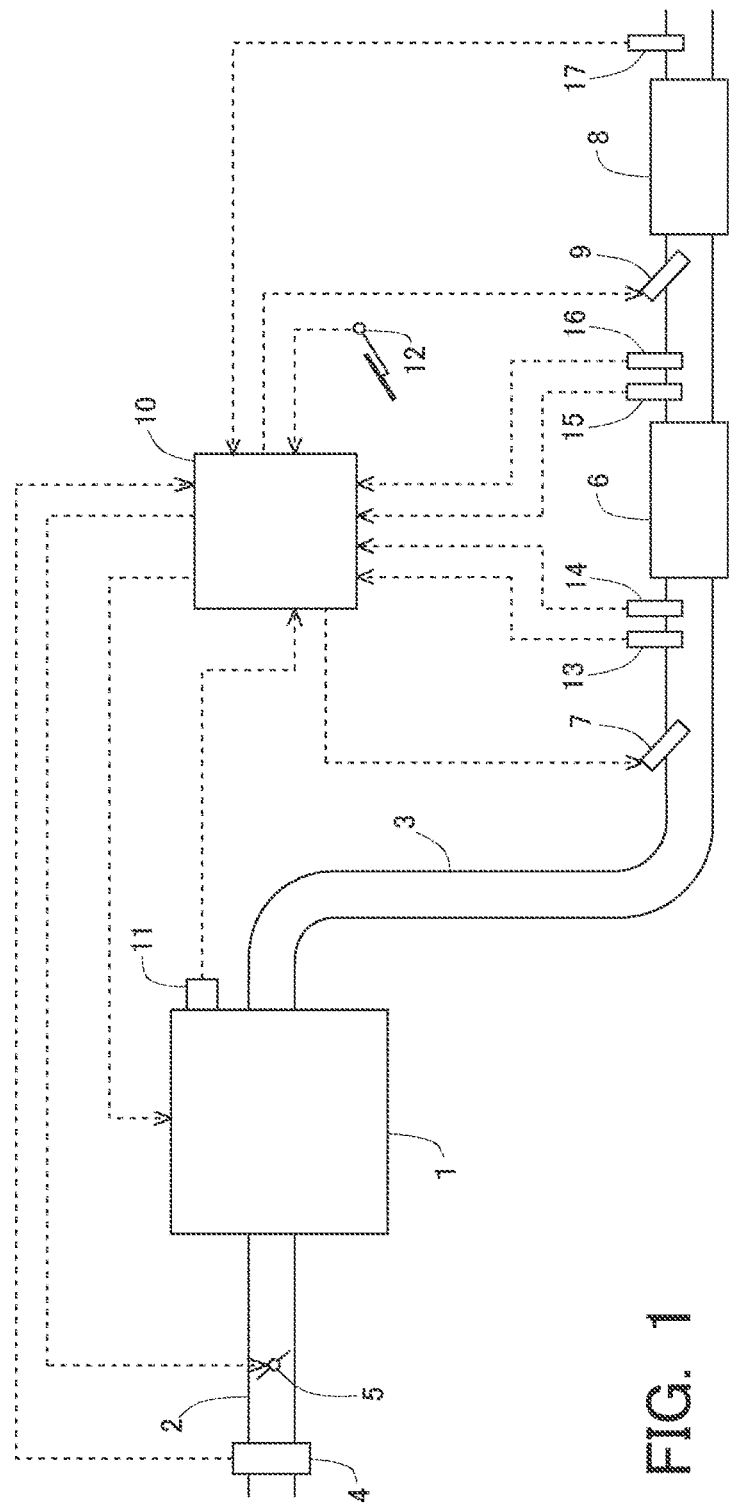
FIG. 1 is a view indicating the schematic construction of an intake system and an exhaust system of an internal combustion engine according to a first embodiment of the present disclosure.

FIG. 1 is a view indicating the schematic construction of an intake system and an exhaust system of an internal combustion engine according to a first embodiment of the present disclosure. The internal combustion engine 1 indicated in FIG. 1 is an internal combustion engine of compression ignition type (diesel engine). However, the present disclosure can also be applied to a lean burn internal combustion engine of spark ignition type which uses gasoline or the like as fuel.

An intake passage 2 and an exhaust passage 3 are connected to the internal combustion engine 1. An air flow meter 4 is arranged in the intake passage 2. The air flow meter 4 serves to detect an amount of intake air sucked into the internal combustion engine 1. Also, a throttle valve 5 is arranged in the intake passage 2 at the downstream side of the air flow meter 4. The throttle valve 5 serves to control the amount of intake air in the internal combustion engine 1 by changing the channel cross section of the intake passage 2.

In the exhaust passage 3, there is arranged a first NOx storage reduction catalyst 6 (hereinafter, sometimes also referred to as a first NSR catalyst 6) and an NOx selective reduction catalyst 8 (hereinafter, sometimes also referred to as an "SCR catalyst 8") as exhaust gas purification catalysts. Then, a fuel addition valve 7 is arranged in the exhaust passage 3 at the upstream side of the first NSR catalyst 6. The fuel addition valve 7 serves to add fuel into exhaust gas. The fuel added from the fuel addition valve 7 is supplied to the first NSR catalyst 6 along with the exhaust gas. In addition, a urea water addition valve 9 is arranged in the exhaust passage 3 between the first NSR catalyst 6 and the SCR catalyst 8. The urea water addition valve 9 serves to add urea water into the exhaust gas, and the urea water thus added is supplied to the SCR catalyst 8. In other words, urea, which is a precursor of ammonia, is supplied to the SCR catalyst 8. Then, ammonia produced by the hydrolyzation of the urea thus supplied adsorbs to the SCR catalyst 8. The NOx in the exhaust gas is reduced by using this ammonia adsorbed to the SCR catalyst 8 as a reducing agent. Here, note that in place of the urea water addition valve 9, there may be arranged an ammonia addition valve that serves to add ammonia gas into the exhaust gas. Then, in this embodiment, the urea water addition valve 9 or the ammonia addition valve corresponds to a reducing agent supply device in the present disclosure. In addition, a filter for trapping particulate matter (PM) in the exhaust gas may be arranged in the exhaust passage 3.

In addition, a first NOx sensor 13 and an air fuel ratio sensor 14 are arranged in the exhaust passage 3 at the downstream side of the fuel addition valve 7 and at the upstream side of the first NSR catalyst 6. The first NOx sensor 13 detects the concentration of NOx in the exhaust gas flowing into the first NSR catalyst 6 (hereinafter, sometimes also referred to as an "incoming exhaust gas"). The air fuel ratio sensor 14 detects the air fuel ratio of the incoming exhaust gas. Moreover, a second NOx sensor 15 and a temperature sensor 16 are arranged in the exhaust passage 3 between the first NSR catalyst 6 and the SCR catalyst 8. The second NOx sensor 15 detects the concentration of NOx in the exhaust gas flowing out from the first NSR catalyst 6 (hereinafter, sometimes also referred to as an "outgoing exhaust gas"). The temperature sensor 16 detects the temperature of the outgoing exhaust gas. Further, a third NOx sensor 17 is arranged in the exhaust passage 3 at the downstream side of the SCR catalyst 8. The third NOx sensor 17 detects the concentration of NOx in the exhaust gas flowing out from the SCR catalyst 8.

In the internal combustion engine 1, there is arranged in combination therewith an electronic control unit (ECU) 10 for controlling the internal combustion engine 1. The air flow meter 4, the first NOx sensor 13, the air fuel ratio sensor 14, the second NOx sensor 15, the temperature sensor 16 and the third NOx sensor 17 are electrically connected to the ECU 10. Further, a crank angle sensor 11 and an accelerator opening sensor 12 are electrically connected to the ECU 10. The crank angle sensor 11 outputs a signal having a correlation with a crank angle of the internal combustion engine 1. The accelerator opening sensor 12 outputs a signal having a correlation with an opening degree of an accelerator of a vehicle on which the internal combustion engine 1 is mounted.

Then, output values or signals of these individual sensors are inputted to the ECU 10. The ECU 10 derives the rotation speed of the internal combustion engine 1 based on the output value of the crank angle sensor 11. Also, the ECU 10 derives the engine load of the internal combustion engine 1 based on the output value of the accelerator opening sensor 12. In addition, the ECU 10 estimates the flow rate of the exhaust gas (hereinafter, sometimes also referred to as an "exhaust gas flow rate") based on the output value of the air flow meter 4, and calculates the flow rate of NOx flowing into the first NSR catalyst 6 (hereinafter, sometimes also referred to as an "NOx incoming flow rate") based on the exhaust gas flow rate and the output value of the first NOx sensor 13, and calculates the flow rate of NOx flowing out from the first NSR catalyst 6 (hereinafter, sometimes also referred to as an "NOx outgoing flow rate") based on the exhaust gas flow rate and the output value of the second NOx sensor 15. Moreover, the ECU 10 estimates the temperature of the first NSR catalyst 6 (hereinafter, sometimes also referred to as an "NSR catalyst temperature") based on the output value of the temperature sensor 16.

Further, fuel injection valves (illustration omitted) of the internal combustion engine 1, the throttle valve 5, the fuel addition valve 7 and the urea water addition valve 9 are electrically connected to the ECU 10. These parts are controlled by the ECU 10. Here, the ECU 10 carries out processing to temporarily change the air fuel ratio of the exhaust gas flowing into the first NSR catalyst 6 from a lean air fuel ratio higher than a stoichiometric air fuel ratio to a rich air fuel ratio lower than the stoichiometric air fuel ratio (hereinafter, sometimes also referred to as "rich spike processing"). In this embodiment, the ECU 10 carries out the rich spike processing by adding fuel into the exhaust gas discharged from the internal combustion engine 1 with the use of the fuel addition valve 7. However, in this embodiment, there is no intention limited to such a case, and the ECU 10 can carry out the rich spike processing by using well-known techniques. For example, the ECU 10 may carry out the rich spike processing by forming a rich mixture in a cylinder using a fuel injection valve (illustration omitted) of the internal combustion engine 1, and by combusting the rich mixture in the cylinder.

Here, in the exhaust gas purification apparatus according to this embodiment which has the first NSR catalyst 6 and the SCR catalyst 8, the concentrations of NOx detected by the first NOx sensor 13, the second NOx sensor 15 and the third NOx sensor 17 will be explained based on FIG. 2. FIG. 2 is a view indicating the concentration of NOx in the exhaust gas discharged from the internal combustion engine 1 and before flowing into the first NSR catalyst 6 (detected by the first NOx sensor 13), the concentration of NOx in the exhaust gas after the first NSR catalyst 6 and before the SCR catalyst 8 (detected by the second NOx sensor 15), and the concentration of NOx in the exhaust gas after the SCR catalyst 8 (detected by the third NOx sensor 17), in the case where the exhaust gas discharged from the internal combustion engine 1 flows through the exhaust passage 3 toward the downstream side sequentially passing through the first NSR catalyst 6 and the SCR catalyst 8.

As indicated in FIG. 2, most of the NOx (a concentration C1) discharged from the internal combustion engine 1 is stored or reduced by the first NSR catalyst 6, so that the concentration of NOx detected after the first NSR catalyst 6 (and before the SCR catalyst 8) is decreased to a concentration C2. Then, this NOx is further reduced by the SCR catalyst 8, so the concentration of NOx in the exhaust gas after the SCR catalyst 8 (a concentration C3) becomes extremely small.

Here, the ECU 10 adds urea water into the exhaust passage 3 by using the urea water addition valve 9, and supplies ammonia produced by hydrolyzation of urea to the SCR catalyst 8. Here, note that this control is hereinafter referred to as "supply control". This supply control is carried out when an amount of adsorption of ammonia in the SCR catalyst 8 (hereinafter, sometimes also referred to as an "amount of adsorbed ammonia") has decreased by the NOx in the exhaust gas being reduced by using as the reducing agent the ammonia adsorbed to the SCR catalyst 8, for example.

Then, in the above-mentioned exhaust gas purification apparatus, the ECU 10 carries out the supply control so that the amount of adsorbed ammonia is maintained in the vicinity of an amount of adsorption (a reference amount of adsorption) which can reduce an amount of NOx corresponding to the above-mentioned concentration C2.

<Storage & Reduction Mechanism of NOx in the NSR Catalyst>

When the rich spike processing is carried out, the reducing agent such as HC, CO, etc., is supplied to the first NSR catalyst 6. Then, the NOx stored in the first NSR catalyst 6 (hereinafter, sometimes also referred to as the "stored NOx") can be reduced by this reducing agent. For example, in cases where the rich spike processing is carried out by the addition of fuel from the fuel addition valve 7, the stored NOx can be mainly reduced by HC. In addition, for example, in cases where the rich spike processing is carried out by the rich combustion performed in each cylinder, the stored NOx can be mainly reduced by CO and HC.

However, even if the rich spike processing is carried out, a part of the stored NOx may be purged from the first NSR catalyst 6, without being reduced. Here, it has been found that when the NOx purged from the first NSR catalyst 6 is made to be reduced with the use of the SCR catalyst 8, a situation where the NOx can not be reduced to a sufficient extent may occur due to the reason that an amount of NOx purged from the NSR catalyst by the rich spike processing (hereinafter, sometimes referred to as an "amount of purged NOx") changes. Then, as a result of an earnest study, the present inventor has found out that such a situation occurs, resulting from a storage mode of the NOx in the first NSR catalyst 6. This will be explained below. Here, note that the amount of NOx stored in the first NSR catalyst 6 (the stored NOx) is hereinafter referred to as a "storage amount of NOx".

Figure 3A:
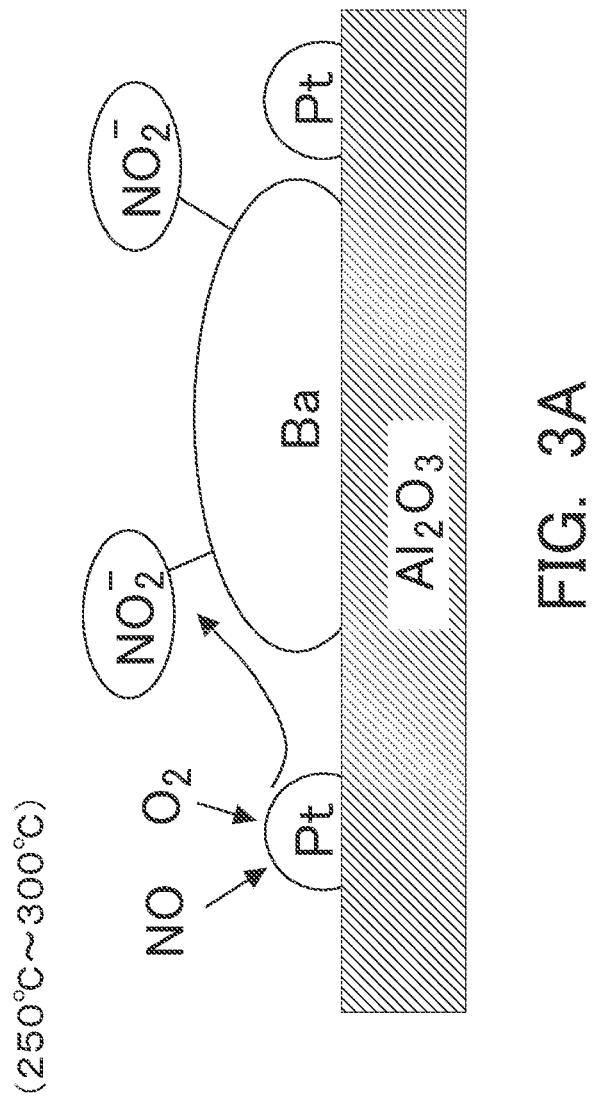
FIG. 3A is a view for explaining a storage mode of NOx in the case where the temperature of the first NSR catalyst is relatively low.
Figure 3B:
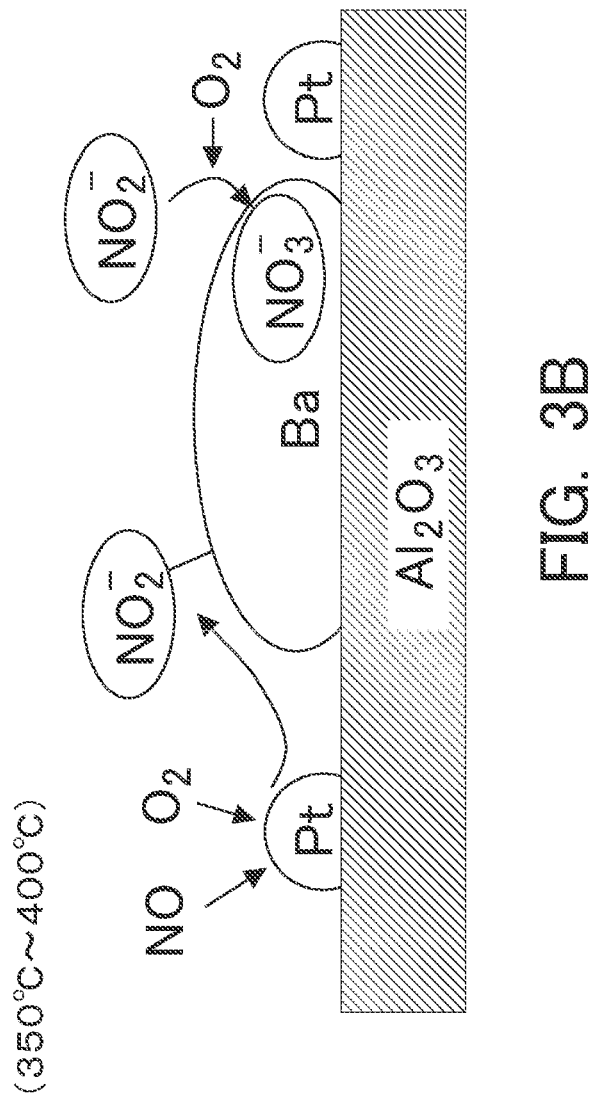
FIG. 3B is a view for explaining a storage mode of NOx in the case where the temperature of the first NSR catalyst is relatively high.

A mechanism estimated for an NOx storage mechanism in the first NSR catalyst 6, newly considered by the present inventor, will be explained based on FIG. 3A and FIG. 3B. FIG. 3A and FIG. 3B are views for explaining the storage mode of NOx in the first NSR catalyst 6.

Here, the storage mode of NOx will be explained by exemplifying a case where in the first NSR catalyst 6, there are used alumina ($Al_2O_3$) as a carrier, and Pt as a precious metal catalyst, and Ba as an NOx storage material. In the NSR catalyst 6, NOx, which has been caused to react with oxygen in the presence of Pt which promotes the reaction of NOx and oxygen, is stored in Ba. Here, it has been newly found out that when NOx is stored in Ba, the storage mode thereof changes with the temperature of the first NSR catalyst 6.

FIG. 3A is a view for explaining the storage mode of NOx in the case where the temperature of the first NSR catalyst 6 is relatively low (e.g., from 250 degrees C. to 300 degrees C.). In an example indicated in FIG. 3A, the NO having flowed into the first NSR catalyst 6 is caused to react with oxygen in the presence of Pt. In that case, NO turns into nitrites ($NO_2^-$). Then, the nitrites are stored into Ba by a relatively weak adsorption force.

On the other hand, FIG. 3B is a view for explaining the storage mode of NOx in the case where the temperature of the first NSR catalyst 6 is relatively high (e.g., from 350 degrees C. to 400 degrees C.). In an example indicated in FIG. 3B, too, similarly to the example indicated in FIG. 3A, the NO having flowed into the first NSR catalyst 6 is caused to react with oxygen in the presence of Pt thereby to generate nitrites ($NO_2^-$), as a result of which the nitrites thus generated are stored into Ba by a relatively weak adsorption force. Here, it has been found out that in cases where the temperature of the first NSR catalyst 6 is relatively high, a part of the nitrites stored in Ba is further caused to react with oxygen thereby to turn into nitrates ($NO_3^-$), which are then stored in Ba by a relatively strong adsorption force. Here, note that the reaction temperature at which a reaction progresses from nitrites to nitrates may change with the deterioration state of Pt, etc., which promotes the reaction of NOx and oxygen. For example, when Pt deteriorates, the above-mentioned reaction temperature tends to become high.

Thus, the storage mode of the first NOx in the NSR catalyst 6 changes according to the temperature of the first NSR catalyst 6. Here, note that the stored NOx (the NOx stored in the first NSR catalyst 6) contains nitrates and nitrites as referred to above. Accordingly, the storage amount of NOx is the amount of nitrites and nitrates stored in the first NSR catalyst 6.

Figure 4:
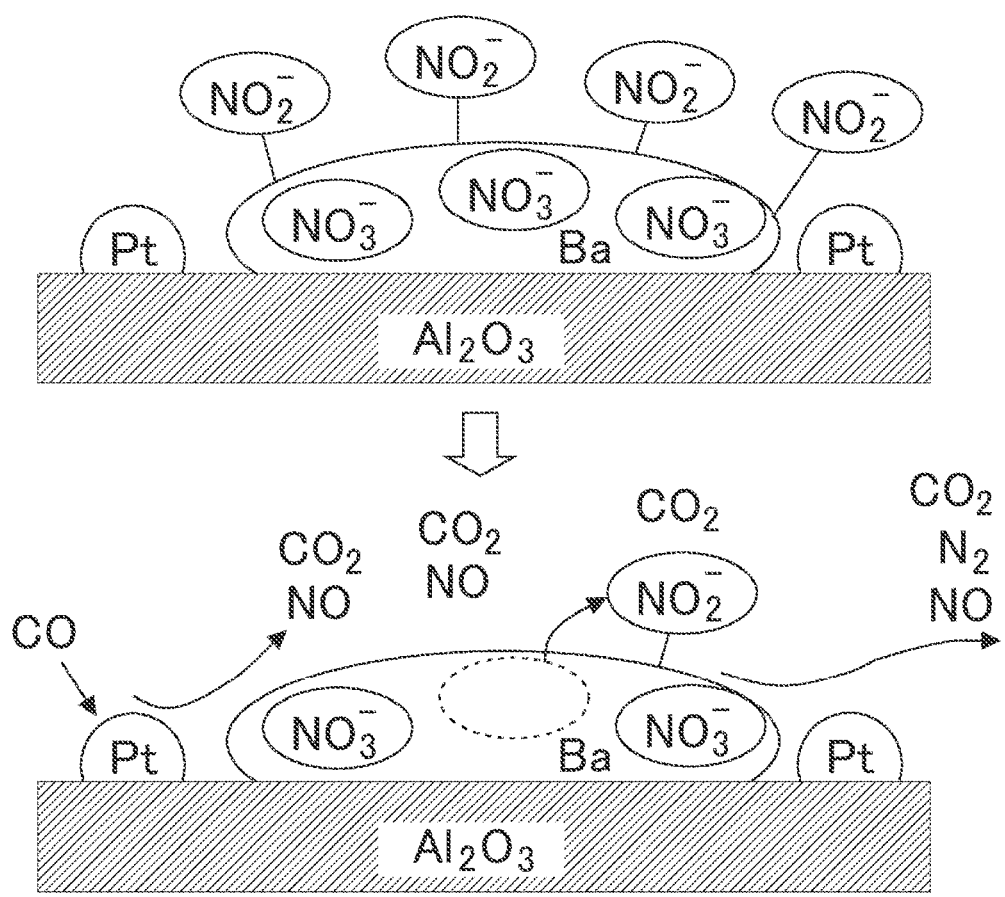
FIG. 4 is a schematic diagram indicating an estimated NOx reduction mechanism in the first NSR catalyst.

Then, when the stored NOx is reduced by the execution of the rich spike processing, the stored NOx is once released from Ba, and is then made to react with the reducing agent in the presence of Pt, whereby NOx is reduced to $N_2$ in the first NSR catalyst 6. This is illustrated by schematic diagrams indicating the estimated reduction mechanism of NOx in the first NSR catalyst 6 at the time of the execution of the rich spike processing indicated in FIG. 4. In FIG. 4, the schematic diagrams in the top and bottom rows represent states before and during the execution of the rich spike processing, respectively.

As indicated in the top row of FIG. 4, nitrites and nitrates are stored in the storage material Ba. Then, when CO is supplied as the reducing agent to such a first NSR catalyst 6, the nitrites are once released form Ba and are reduced to NO by the reducing agent, as indicated in the bottom row of FIG. 4. On the other hand, a part of the nitrates is reduced to nitrites which can be released from Ba, but most of the nitrates tend to continue to be stored in Ba. In other words, the nitrites are easy to be released from Ba, but the nitrates are hard to be released from Ba. Accordingly, in cases where the amount of nitrites, which are easy to be released from Ba, is large in the stored NOx, the stored NOx is easy to be reduced, but on the other hand, in cases where the amount of nitrates, which are hard to be released from Ba, is large in the stored NOx, the stored NOx becomes hard to be reduced.

Figure 5:
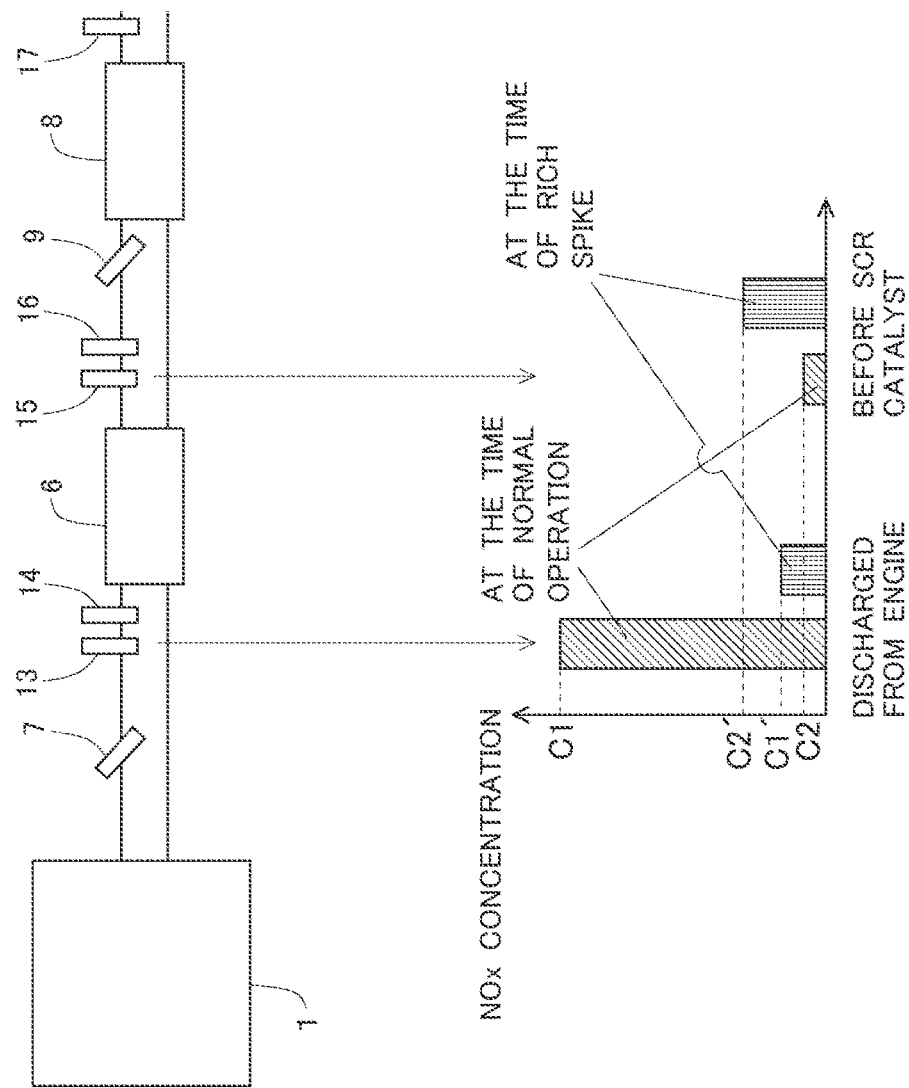
FIG. 5 is a view indicating a comparison of the concentration of NOx in the exhaust gas after the first NSR catalyst and before the SCR catalyst between when normal operation of the internal combustion engine is carried out, and when NOx is purged from the first NSR catalyst according to the execution of rich spike processing.

Moreover, as described above, even if the rich spike processing is carried out, a part of the stored NOx may be purged from the first NSR catalyst 6, without being reduced. A comparison of the concentration of NOx in the exhaust gas after the first NSR catalyst 6 and before the SCR catalyst 8 between when normal operation of the internal combustion engine is carried out (this being similar to the concentration of NOx indicated in the above-mentioned FIG. 2) and when NOx is purged from the first NSR catalyst 6 according to the execution of the rich spike processing is indicated in FIG. 5. As indicated in FIG. 5, when the normal operation of the internal combustion engine 1 is carried out, most of the NOx (of the concentration C1) discharged from the internal combustion engine 1 is stored by the first NSR catalyst 6, so that the concentration of NOx detected after the first NSR catalyst 6 and before the SCR catalyst 8 is decreased to the concentration C2. On the other hand, assuming that the rich spike processing is performed when idling operation of the internal combustion engine 1 is carried out, the concentration of NOx discharged from the internal combustion engine 1 at this time becomes C1' which is smaller than C1. Here, when NOx is purged from the first NSR catalyst 6 according to the execution of the rich spike processing, the concentration of NOx detected after the first NSR catalyst 6 and before the SCR catalyst 8 may become C2' which is larger than C2. Thus, in cases where the concentration of NOx after the first NSR catalyst 6 and before the SCR catalyst 8 increases, if the amount of adsorbed ammonia remains maintained in the vicinity of the amount of adsorption (the reference amount of adsorption) which can reduce the amount of NOx corresponding to the concentration C2, there is a fear that the NOx purged from the first NSR catalyst 6 may not be reduced to a sufficient extent in the SCR catalyst 8.

Further, even if the storage amount of NOx is the same, the larger the amount of nitrites easy to be released from Ba in the stored NOx, the larger the amount of purged NOx tends to become. In contrast to this, even if the storage amount of NOx is the same, the larger the amount of nitrates hard to be released from Ba in the stored NOx, the smaller the amount of purged NOx tends to become. Then, when the NOx purged from the first NSR catalyst is made to be reduced by using SCR catalyst 8, there is a fear that exhaust emissions may deteriorate if such a situation is not taken into consideration.

<Supply Amount Control>

Here, the predetermined determination temperature is defined as a temperature at which NOx can turn into nitrates and can be stored into the first NSR catalyst 6, when the NSR catalyst temperature becomes equal to or higher than the determination temperature. Then, in cases where the NSR catalyst temperature becomes less than the predetermined determination temperature in at least a part of the determination period of time, NOx will turn into nitrites and will be stored in the first NSR catalyst 6. As a result, when current rich spike processing is carried out, a part of the stored NOx will be purged from the first NSR catalyst 6. Accordingly, in this case, the ECU 10 carries out supply control according to the rich spike processing. With this, the NOx purged from the first NSR catalyst 6 by the rich spike processing may be reduced by the ammonia supplied by the supply control in the SCR catalyst 8.

Then, the nitrites in the entire stored NOx becomes larger as a period of time in which the NSR catalyst temperature becomes less than the predetermined determination temperature within the determination period of time (hereinafter, sometimes also referred to as a "catalyst low temperature period") is longer. Accordingly, even if the storage amount of NOx is the same, the amount of purged NOx becomes larger in the case where the catalyst low temperature period is long, in comparison with the case where it is short. Thus, the ECU 10 controls such that in cases where the storage amount of NOx is the same, the amount of supply of the reducing agent in the supply control carried out according to the rich spike processing is made larger as the catalyst low temperature period becomes longer. Here, note that the control to make the amount of supply of the reducing agent larger in this manner is hereinafter referred to as "supply amount control". In this embodiment, the ECU 10 carries out the supply amount control by making large an amount of urea water (a urea water supply amount) to be added from the urea water addition valve 9. As a result of this, the NOx purged from the first NSR catalyst 6 by the rich spike processing is reduced in an appropriate manner by the ammonia produced by hydrolyzation of urea in the SCR catalyst 8, thus making it possible to suppress as much as possible occurrence of a situation where exhaust emissions deteriorate.

Figure 6:
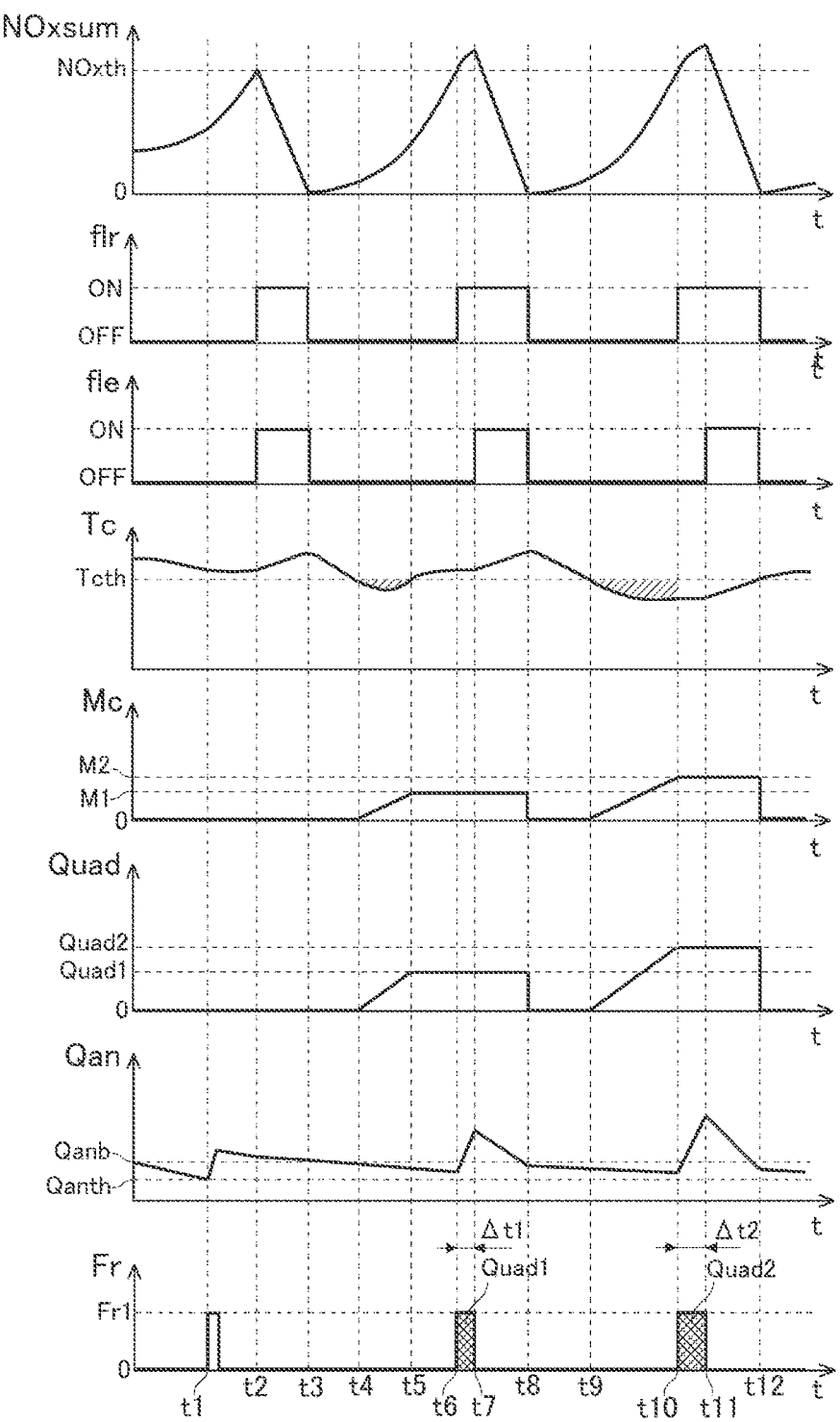
FIG. 6 is a time chart indicating the changes over time of a storage amount of NOx, a request flag, an execution flag, an NSR catalyst temperature, a low temperature counter, a set value of a urea water addition amount, an amount of adsorbed ammonia, and an addition flow rate of urea water according to the first embodiment of the present disclosure.

Here, a brief explanation will be given to the control processing executed by the ECU 10 in this embodiment, by using a time chart indicated in FIG. 6. FIG. 6 is the time chart indicating the changes over time of a storage amount of NOx NOxsum, a request flag fir which is a flag indicating whether execution of the rich spike processing has been requested, an execution flag fie which is a flag indicating whether the rich spike processing has been carried out, a low temperature counter Mc which is a counter for counting a period of time in which the NSR catalyst temperature becomes less than the determination temperature, a set value Quad of the amount of addition of urea water (hereinafter, sometimes also referred to as a "urea water addition amount set value") to be added from the urea water addition valve 9 by the supply control carried out according to the rich spike processing, an amount of adsorbed ammonia Qan, and an addition flow rate Fr of the urea water to be added from the urea water addition valve 9 (hereinafter, sometimes also referred to as an "addition flow rate of urea water"). Here, note that in the control of this embodiment indicated in FIG. 6, when the storage amount of NOx reaches a reference amount NOxth, a request for execution of the rich spike processing is satisfied. Here, the reference amount NOxth is a threshold value which determines the satisfaction of the request for execution of the rich spike processing.

In the control indicated in FIG. 6, similar to the conventional technique, the supply control is carried out so that the amount of adsorbed ammonia is maintained in the vicinity of the reference amount of adsorption Qanb. Specifically, the supply control is carried out by adding urea water at a flow rate of Fr1 at a time point t1 at which the amount of adsorbed ammonia becomes a lower limit adsorption amount Qanth, for a predetermined period of time. In that case, the amount of adsorbed ammonia is increased, and the amount of adsorbed ammonia can be maintained in the vicinity of the reference amount of adsorption Qanb.

Then, at a time point t2 at which the storage amount of NOx becomes the reference amount NOxth, the request for execution of the rich spike processing is satisfied, and the request flag is set to ON. Here, in a period of time before the time point t2, the NSR catalyst temperature has not become less than the determination temperature Tcth. For that reason, the low temperature counter at the time point t2 has become 0. In other words, the catalyst low temperature period becomes 0. Here, note that the determination temperature Tcth is defined as a temperature at which NOx can turn into nitrates and can be stored into the first NSR catalyst 6, when the NSR catalyst temperature becomes equal to or higher than the determination temperature Tcth, as mentioned above. In this case, the supply control is not carried out according to the rich spike processing. For that reason, the execution flag is also set to ON at the time point t2 at which the request flag is set to ON, and the rich spike processing is carried out from the time point t2 to a time point t3. Here, note that when the execution of the rich spike processing is completed, the storage amount of NOx becomes an amount in the vicinity of 0.

Here, focusing on a determination period of time (i.e., a period of time from the time point t3 to a time point t6) from the completion of the execution of the rich spike processing started at the time point t2 (i.e., the last rich spike processing) to the request for execution of the rich spike processing satisfied at a time point t6 (i.e., the current rich spike processing), the NSR catalyst temperature is less than the determination temperature Tcth in a period of time from a time point t4 to a time point t5, as indicated in FIG. 6. In that case, at the time point t4, the counting of time by the low temperature counter is started, and at the time point t5, the low temperature counter becomes M1. Then, as the value of the low temperature counter is increased, i.e., as the catalyst low temperature period becomes longer, the urea water addition amount set value is made larger from 0, and the urea water addition amount set value becomes Quad1 at the time point t5. Here, note that in a period of time from the time point t5 to the time point t6, the NSR catalyst temperature is equal to or higher than the determination temperature Tcth, the counting of time by the low temperature counter is not carried out.

Then, at the time point t6 at which the request flag is set to ON, the low temperature counter is M1, i.e., the NSR catalyst temperature is less than the determination temperature Tcth in at least a part of the determination period of time, so the supply control is carried out according to the rich spike processing. In this embodiment, the supply control is carried out immediately before the rich spike processing is carried out, and the amount of adsorbed ammonia is increased in advance before the execution of the rich spike processing. Specifically, the supply control is carried out by adding urea water at the flow rate of Fr1 for a period of time Δt1 from the time point t6, as indicated in FIG. 6. This period of time Δt1 is set in such a manner that the urea water addition amount becomes Quad1. Then, at a time point t7 at which the addition of urea water in the amount of Quad1 is completed, the execution flag is set to ON, and the rich spike processing is carried out. In this rich spike processing, NOx will be purged from the first NSR catalyst 6, as mentioned above, but the amount of adsorbed ammonia has been increased in advance before the execution of the rich spike processing, as indicated in FIG. 6, so the NOx can be reduced in an appropriate manner by the ammonia adsorbed to the SCR catalyst 8. Here, note that when the execution of the rich spike processing is completed, the low temperature counter is initialized to 0, and the urea water addition amount set value is also accordingly initialized to 0.

On the other hand, focusing on a determination period of time from the completion of the execution of the rich spike processing started at the time point t7 to a request for execution of the rich spike processing satisfied at a time point t10 (i.e., a period of time from a time point t8 to the time point t10), the NSR catalyst temperature is less than the determination temperature Tcth in a period of time from a time point t9 to a time point t10, as indicated in FIG. 6. In that case, at the time point t9, the counting of time by the low temperature counter is started, and at the time point t10, the low temperature counter becomes M2. Then, at the time point t10, the urea water addition amount set value accordingly becomes Quad2.

Then, at the time point t10 at which the request flag is set to ON, the low temperature counter is M2, so the supply control is carried out by adding urea water at the flow rate of Fr1 for a period of time Δt2 from the time point t10. This period of time Δt2 is decided so that the urea water addition amount becomes Quad2. Then, at a time point t11 at which the addition of urea water in the amount of Quad2 is completed, the execution flag is set to ON, and the rich spike processing is carried out. Here, the value M2 of the low temperature counter at the time point t10 is larger than the value M1 of the low temperature counter at the time point t6. Stated in another way, the catalyst low temperature period in a determination period of time from the time point t8 to the time point t10 is longer than that in a determination period of time from the time point t3 to the time point t6. Accordingly, in the determination period of time from the time point 8 to the time point t10, nitrates become easier to be stored into the first NSR catalyst 6 than in the determination period of time from the time point t3 to the time point t6. In other words, even if the storage amount of NOx is the same, the amount of purged NOx in rich spike processing started at the time point t11 becomes larger than the amount of purged NOx in the rich spike processing started at the time point t7. Accordingly, the urea water addition amount Quad2 in the supply control started at the time point t10 is made larger than the urea water addition amount Quad1 in the supply control started at the time point t6. In other words, the supply amount control is carried out. As a result of this, it becomes possible to suitably reduce NOx purged from the first NSR catalyst 6.

Thus, in this embodiment, in cases where the storage amount of NOx is the same, the amount of supply of the reducing agent in the supply control carried out according to the rich spike processing is made larger as the catalyst low temperature period becomes longer. As a result of this, the NOx purged from the first NSR catalyst 6 is reduced in an appropriate manner, thus suppressing as much as possible a situation where exhaust emissions deteriorate.

Figure 7:
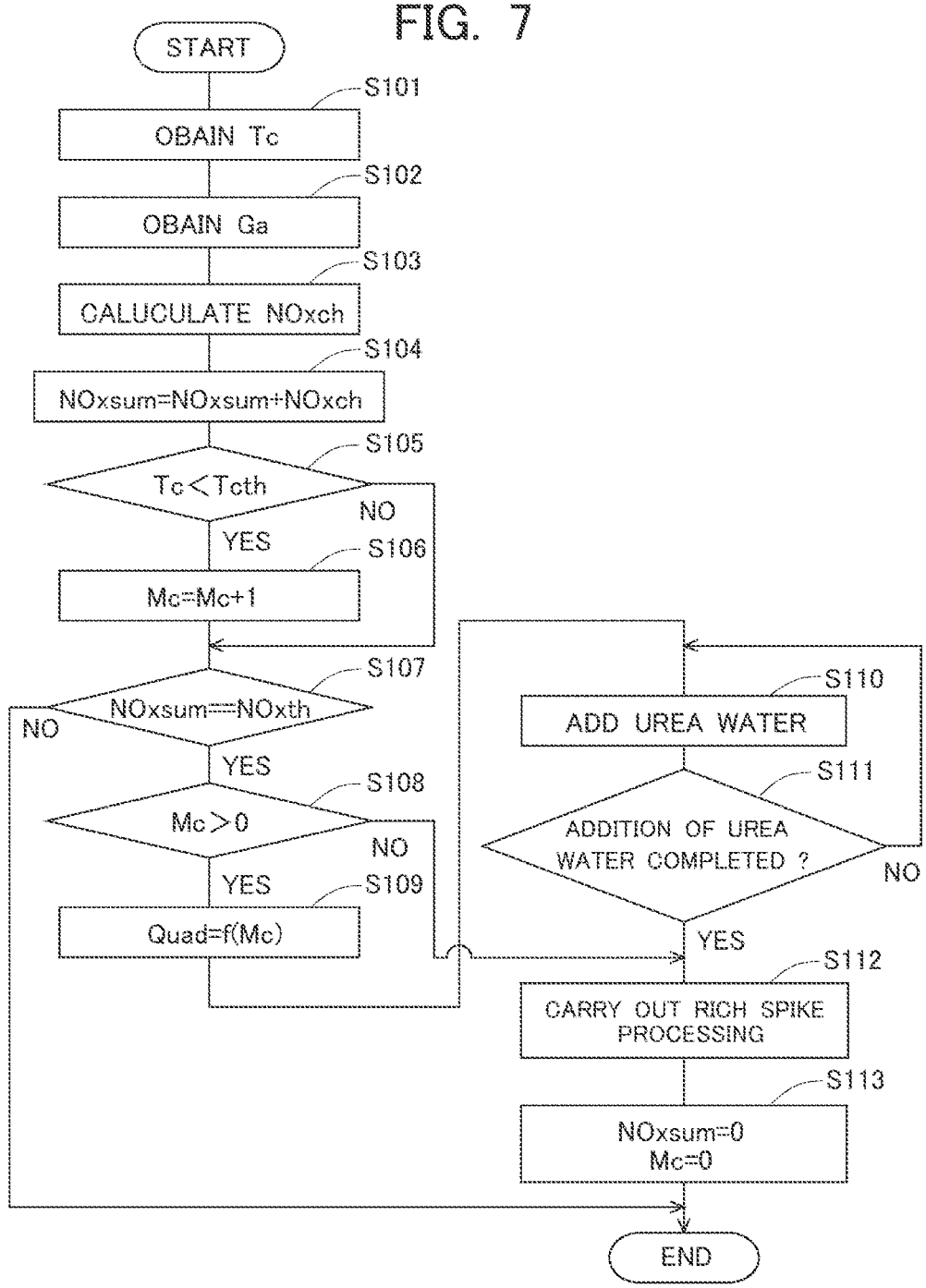
FIG. 7 is a flow chart indicating a control flow according to the first embodiment of the present disclosure.

Next, a control flow or routine carried out in this embodiment will be described based on FIG. 7. FIG. 7 is a flow chart indicating the control flow or routine according to this embodiment. In this embodiment, this routine is carried out at a predetermined operation interval or period Δt in a repeated manner by the ECU 10 during the operation of the internal combustion engine 1.

In this routine, first, in step S101, the NSR catalyst temperature Tc is obtained. In step S101, the NSR catalyst temperature Tc is calculated based on the output value of the temperature sensor 16. Alternatively, in step S101, the NSR catalyst temperature Tc may be estimated based on the engine rotation speed and the engine load of the internal combustion engine 1. At this time, in cases where fuel is added from the fuel addition valve 7, the NSR catalyst temperature Tc may be estimated by taking account of an amount of heat generation of the added fuel.

Subsequently, in step S102, the exhaust gas flow rate Ga is obtained. In step S102, the exhaust gas flow rate Ga is calculated based on the output value of the air flow meter 4.

Thereafter, in step S103, an amount of change of the NOx in the first NSR catalyst 6 (hereinafter, sometimes also referred to simply as an "amount of change") NOxch until the present time after this routine was carried out last time is calculated. In step S103, the NOx incoming flow rate is calculated based on the exhaust gas flow rate Ga obtained in step S102 and the output value of the first NOx sensor 13. In addition, the NOx outgoing flow rate is calculated based on the exhaust gas flow rate Ga and the output value of the second NOx sensor 15. Moreover, the amount of change of the NOx in the first NSR catalyst 6 per unit time is calculated by adding up the NOx incoming flow rate and the NOx outgoing flow rate. Then, the amount of change NOxch is calculated by multiplying the amount of change of the NOx per unit time by the operation period Δt.

Then, in step S104, the storage amount of NOx NOxsum is calculated. In step S104, the storage amount of NOx NOxsum is calculated by adding the amount of change NOxch calculated in step S103 to the storage amount of NOx NOxsum.

Subsequently, in step S105, it is determined whether the NSR catalyst temperature Tc calculated in step S101 is less than the determination temperature Tcth. Here, note that the determination temperature Tcth is as mentioned above. Then, in cases where an affirmative determination is made in step S105, the routine of the ECU 10 goes to the processing of step S106, whereas in cases where a negative determination is made in step S105, the routine of the ECU 10 goes to the processing of step S107.

In cases where an affirmative determination is made in step S105, then in step S106, the low temperature counter Mc is added by 1. In other words, in step S106, a period of time in which the NSR catalyst temperature Tc becomes less than the determination temperature Tcth is counted.

Subsequently, in step S107, it is determined whether the storage amount of NOx NOxsum calculated in step S104 becomes the reference amount NOxth. Here, the reference amount NOxth is a threshold value which determines the satisfaction of the request for execution of the rich spike processing, as mentioned above. Then, in cases where an affirmative determination is made in step S107, the routine of the ECU 10 goes to the processing of step S108, whereas in cases where a negative determination is made in step S107, the execution of this routine is terminated.

In cases where an affirmative determination is made in step S107, then in step S108, it is determined whether the low temperature counter Mc is larger than 0. In other words, it is determined whether the catalyst low temperature period is longer than zero. Then, in cases where an affirmative determination is made in step S108, this is a case where the NSR catalyst temperature becomes less than the determination temperature Tcth in at least a part of the determination period of time, and the routine of the ECU 10 goes to the processing of step S109. On the other hand, in cases where a negative determination is made in step S108, this is a case where the NSR catalyst temperature becomes equal to or higher than the determination temperature Tcth in the entire determination period of time, and the routine of the ECU 10 goes to the processing of step S112.

Figure 8:
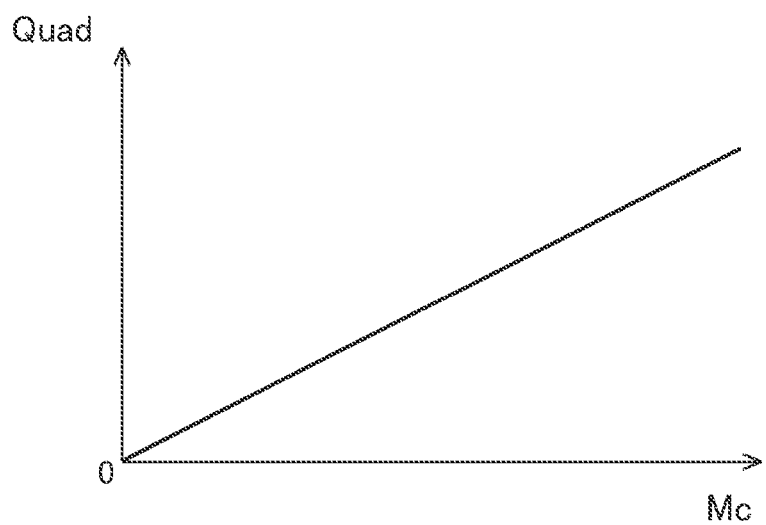
FIG. 8 is a view indicating a correlation between the set value of the urea water addition amount and the low temperature counter.

In cases where an affirmative determination is made in step S108, then in step S109, the urea water addition amount set value Quad is calculated. In step S109, the urea water addition amount set value Quad is calculated based on the value of the low temperature counter Mc. Specifically, the urea water addition amount set value Quad and the value of the low temperature counter Mc have a correlation with each other as indicated in FIG. 8. Then, this correlation has been stored in advance in a ROM of the ECU 10 as a function or a map, and in step S109, the urea water addition amount set value Quad is calculated based on the correlation and the value of the low temperature counter Mc counted in step S106. When the value of the low temperature counter Mc is 0, the urea water addition amount set value Quad calculated in this manner becomes 0, as indicated in FIG. 8. Then, the urea water addition amount set value Quad is made larger as the value of the low temperature counter Mc becomes larger from 0. In other words, in cases where the storage amount of NOx NOxsum is the reference amount NOxth, the urea water addition amount set value Quad is made larger as the catalyst low temperature period is longer.

Subsequently, in step S110, urea water is added from the urea water addition valve 9. With this, the amount of adsorbed ammonia is increased in advance before the execution of the rich spike processing. Thereafter, in step S111, it is determined whether the addition of the urea water from the urea water addition valve 9 has been completed. Specifically, in step S111, it is determined whether the addition of the urea water in the amount of the urea water addition amount set value Quad calculated in step S109 has been completed. Then, in cases where an affirmative determination is made in step S111, the routine of the ECU 10 goes to the processing of step S112, whereas in cases where a negative determination is made in step S111, the routine of the ECU 10 returns to the processing of step S110.

In cases where an affirmative determination is made in step S111, or in cases where a negative determination is made in step S108, then in step S112, the rich spike processing is carried out. In step S112, the rich spike processing is carried out by adding fuel into the exhaust gas discharged from the internal combustion engine 1 with the use of the fuel addition valve 7. However, as mentioned above, the rich spike processing may be carried out by performing rich combustion in a cylinder.

Subsequently, in step S113, the storage amount of NOx NOxsum and the value of the low temperature counter Mc are initialized to 0. Then, after the processing of step S113, the execution of this routine is ended.

In this embodiment, the ECU 10 carries out the above-mentioned control flow, whereby even if NOx is purged from the first NSR catalyst 6 accompanying the execution of the rich spike processing, the NOx is reduced in an appropriate manner in the SCR catalyst 8. As a result of this, a situation where exhaust emissions deteriorate can be suppressed as much as possible.

<Modification of the First Embodiment>

Next, reference will be made to a modification of the above-mentioned first embodiment. Here, note that in this modification, a detailed explanation of substantially the same construction and substantially the same control processing as in the first embodiment will be omitted.

Figure 9:
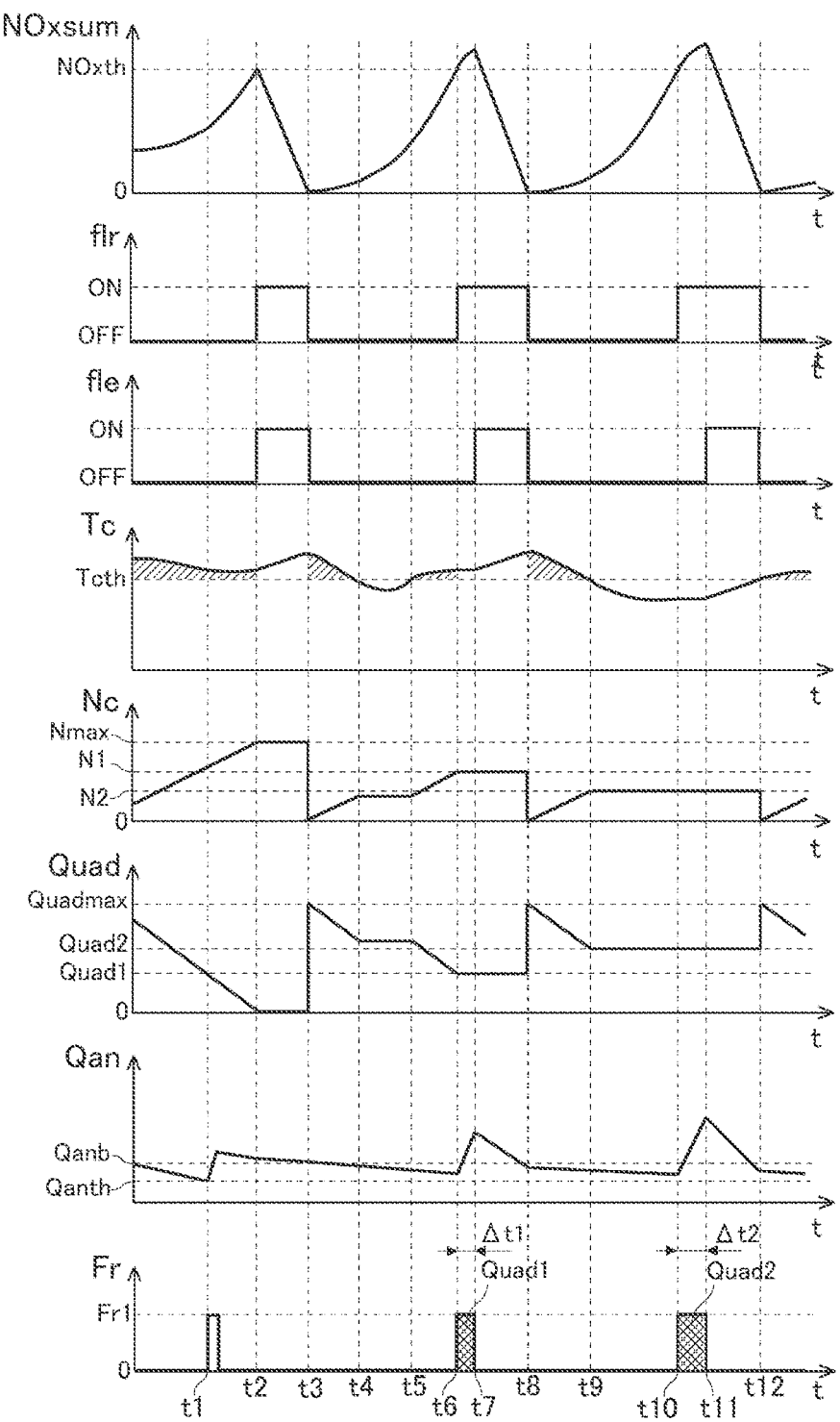
FIG. 9 is a time chart indicating the changes over time of a storage amount of NOx, a request flag, an execution flag, an NSR catalyst temperature, a high temperature counter, a set value of a urea water addition amount, an amount of adsorbed ammonia, and an addition flow rate of urea water according to a modification of the first embodiment of the present disclosure.

Brief reference will be made to the control processing executed by the ECU 10 in this modification, with the use of a time chart indicated in FIG. 9. FIG. 9 is the time chart indicating the changes over time of a storage amount of NOx NOxsum, a request flag flr, an execution flag fle, an NSR catalyst temperature Tc, a high temperature counter Nc which is a counter for counting a period of time in which the NSR catalyst temperature is equal to or higher than a determination temperature, a urea water addition amount set value Quad, an amount of adsorbed ammonia Qan, and an addition flow rate of urea water Fr, according to this modification of the first embodiment. In this modification, unlike the above-mentioned FIG. 6 of the first embodiment, a period of time in which the NSR catalyst temperature becomes equal to or higher than a determination temperature Tcth is counted. Then, the urea water addition amount set value is calculated based on the value of the high temperature counter.

In the control indicated in FIG. 9, the NSR catalyst temperature is equal to or higher than the determination temperature Tcth in the entire determination period of time from the completion of the execution of the last rich spike processing to a request for execution of rich spike processing satisfied at a time point t2 (current rich spike processing). Thus, in cases where the NSR catalyst temperature becomes equal to or higher than the determination temperature Tcth in the entire determination period of time, the high temperature counter is set to Nmax. Then, when the high temperature counter is Nmax, the urea water addition amount set value becomes 0. For that reason, at the time point t2 at which the request flag is set to ON, the execution flag is also set to ON, and the rich spike processing is carried out from the time point t2 to a time point t3. Here, note that when the execution of the rich spike processing is completed, the high temperature counter is initialized to 0, and the urea water addition amount set value is also accordingly initialized to an addition amount set maximum value Quadmax. Here, the addition amount set maximum value Quadmax is an urea water addition amount set value in the case where the NSR catalyst temperature becomes less than the determination temperature Tcth in the entire determination period of time. This addition amount set maximum value Quadmax is the urea water addition amount set value at which the amount of adsorbed ammonia after the execution of the supply control carried out according to the rich spike processing is set to be a maximum within a range which is less than an amount of adsorption (a slip development adsorption amount) at which the slip of ammonia from the SCR catalyst 8 starts. Accordingly, in cases where the NSR catalyst temperature is assumed to be less than the determination temperature Tcth in the entire determination period of time, the urea water addition amount set value is set to the addition amount set maximum value Quadmax, whereby the amount of adsorbed ammonia before the execution of the rich spike processing can be made as large as possible, while suppressing the slip of ammonia from the SCR catalyst 8.

Here, focusing on a determination period of time from a time point t3 to a time point t6, as indicated in FIG. 9, the NSR catalyst temperature is equal to or higher than the determination temperature Tcth in a period of time from the time point t3 to a time point t4 and in a period of time from a time point t5 to the time point t6. In that case, in these periods of time, the counting of time by the high temperature counter is performed, and at the time point t6, the high temperature counter becomes N1. Then, as the value of the high temperature counter is increased, the urea water addition amount set value is decreased from the addition amount set maximum value Quadmax, and the urea water addition amount set value becomes Quad1 at the time point t6. Then, the supply control is carried out by adding urea water at the flow rate of Fr1 for a period of time Δt1 from the time point t6, and at a time point t7 at which the addition of the urea water in the amount of Quad1 is completed, the execution flag is set to ON, so that the rich spike processing is carried out.

On the other hand, focusing on a determination period of time from a time point t8 to a time point t10, the NSR catalyst temperature is equal to or higher than the determination temperature Tcth in a period of time from the time point t8 to a time point t9, as indicated in FIG. 9. In that case, at the time point t8, the counting of time by the high temperature counter is started, and at the time point t9, the high temperature counter becomes $N_2$. Then, at the time point t9, the urea water addition amount set value accordingly becomes Quad2. Thereafter, the supply control is carried out by adding urea water at the flow rate of Fr1 for a period of time $\Delta t2$ from the time point t10, and at a time point t11 at which the addition of the urea water in the amount of Quad2 is completed, the execution flag is set to ON, so that the rich spike processing is carried out.

As described above, in this modification, in cases where the storage amount of NOx is the same, the urea water addition amount set value is made smaller as the period of time in which the NSR catalyst temperature becomes equal to or higher than the determination temperature Tcth is longer. Stated in another way, in cases where the storage amount of NOx is the same, the urea water addition amount set value is made larger as the catalyst low temperature period is longer. As a result of this, it becomes possible to suitably reduce NOx purged from the first NSR catalyst 6.

Figure 10:
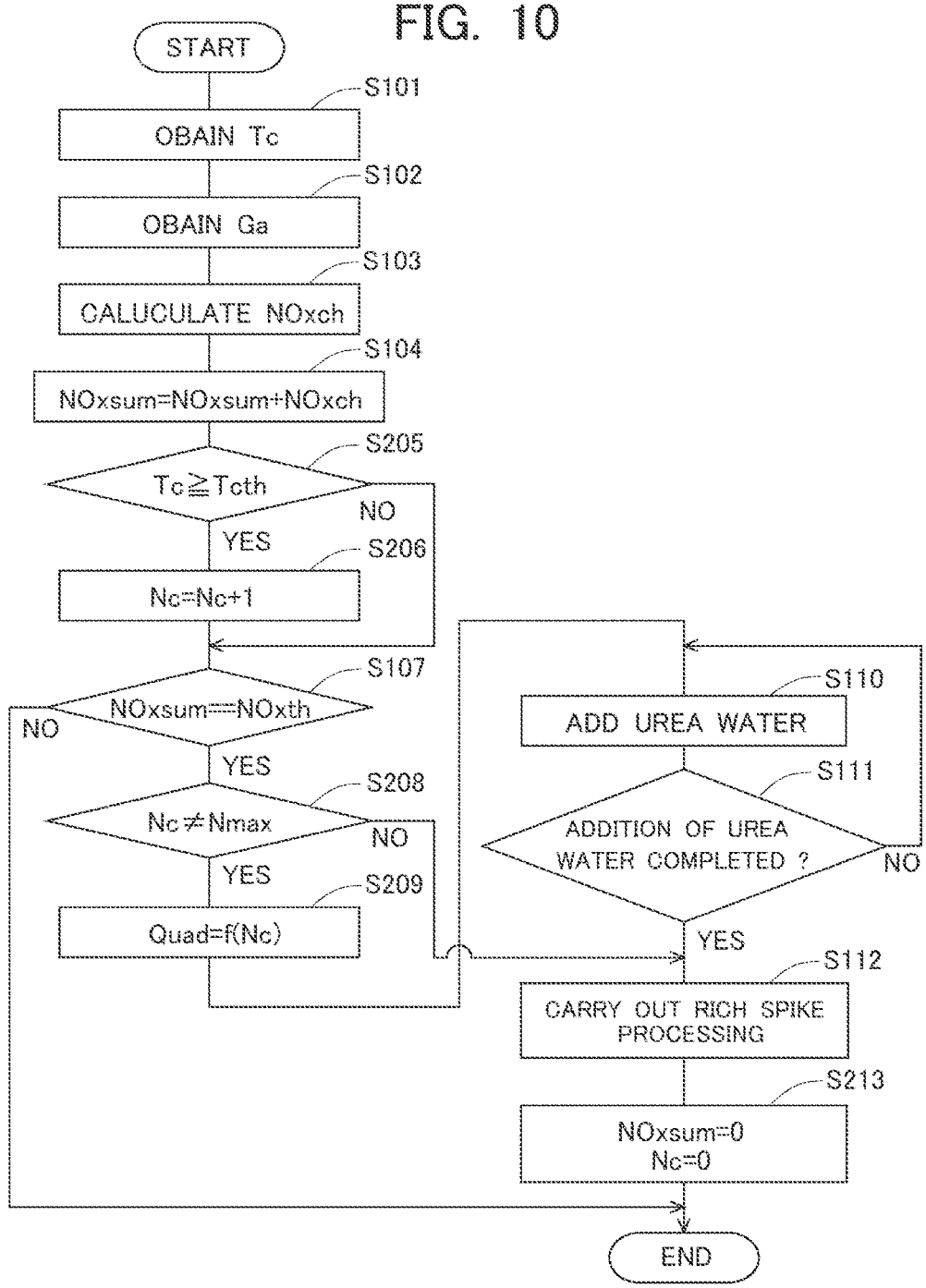
FIG. 10 is a flow chart indicating a control flow according to the modification of the first embodiment of the present disclosure.

Next, a control flow or routine carried out in this modification will be described based on FIG. 10. FIG. 10 is a flow chart indicating the control flow or routine according to this modification. In this modification, this routine is carried out at a predetermined operation interval or period At in a repeated manner by the ECU 10 during the operation of the internal combustion engine 1. Here, note that in respective processings indicated in FIG. 10, the same reference signs are attached to the substantially same processings as those indicated in the above-mentioned FIG. 7, and the detailed explanation thereof is omitted.

In the control flow or routine indicated in FIG. 10, after the processing of step S104, it is determined in step S205 whether the NSR catalyst temperature Tc obtained in step S101 is equal to or higher than the determination temperature Tcth. Here, note that the determination temperature Tcth is as mentioned above. Then, in cases where an affirmative determination is made in step S205, the routine of the ECU 10 goes to the processing of step S206, whereas in cases where a negative determination is made in step S205, the routine of the ECU 10 goes to the processing of step S107.

In cases where an affirmative determination is made in step S205, then in step S206, the high temperature counter Nc is added by 1. In other words, in step S206, a period of time in which the NSR catalyst temperature Tc becomes equal to or higher than the determination temperature Tcth is counted or added to the temperature counter Nc. Then, after the processing of step S206, the routine of the ECU 10 goes to the processing of step S107.

Thereafter, in cases where an affirmative determination is made in step S107, then in step S208, it is determined whether the high temperature counter Nc becomes Nmax. Here, note that Nmax is as mentioned above. Then, in cases where an affirmative determination is made in step S208, this is a case where the NSR catalyst temperature Tcth in at least a part of the determination period of time, and the routine of the ECU 10 goes to the processing of step S209. On the other hand, in cases where a negative determination is made in step S208, this is a case where the NSR catalyst temperature becomes equal to or higher than the determination temperature Tcth in the entire determination period of time, and the routine of the ECU 10 goes to the processing of step S112.

Figure 11:
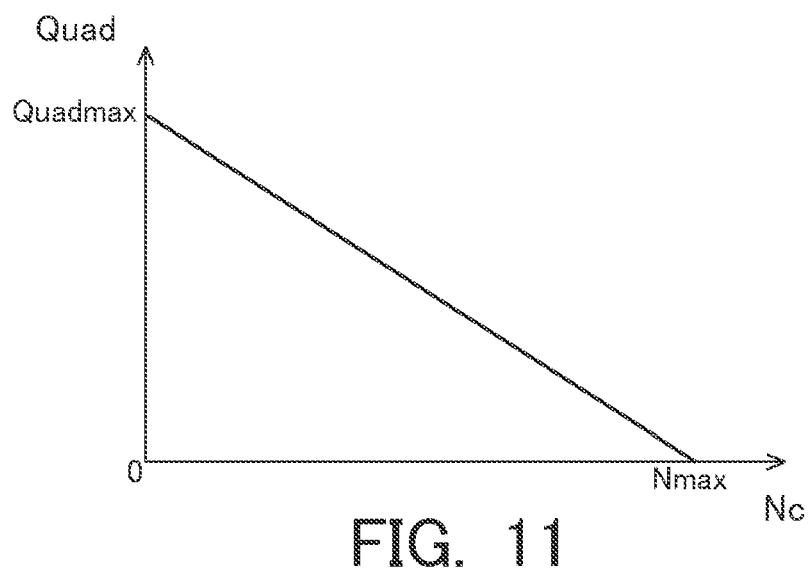
FIG. 11 is a view indicating a correlation between the set value of the urea water addition amount and the high temperature counter.

In cases where an affirmative determination is made in step S208, then in step S209, the urea water addition amount set value Quad is calculated. In step S209, the urea water addition amount set value Quad is calculated based on the value of the high temperature counter Nc. Specifically, the urea water addition amount set value Quad and the value of the high temperature counter Mc have a correlation with each other as indicated in FIG. 11. Then, this correlation has been stored in advance in the ROM of the ECU 10 as a function or a map, and in step S209, the urea water addition amount set value Quad is calculated based on the correlation and the value of the high temperature counter Nc counted in step S206. When the value of the high temperature counter Nc is 0, the urea water addition amount set value Quad calculated in this manner becomes the addition amount set maximum value Quadmax, as indicated in FIG. 11. Then, as the value of the high temperature counter Nc becomes larger from 0, the urea water addition amount set value Quad is made smaller, and when the value of the high temperature counter Nc is Nmax, the urea water addition amount set value Quad becomes 0. Thereafter, after the processing of step S209, the routine of the ECU 10 goes to the processing of step S110.

Subsequently, after the processing of step S112, the storage amount of NOx NOxsum and the value of the high temperature counter Nc are initialized to 0 in step S213. Then, after the processing of step S213, the execution of this routine is ended.

By the execution of the above-mentioned control flow or routine by means of the ECU 10, too, NOx is reduced in an appropriate manner in the SCR catalyst 8, thus making it possible to suppress as much as possible a situation where exhaust emissions deteriorate.

Second Embodiment

Next, reference will be made to a second embodiment of the present disclosure based on FIG. 12 through FIG. 14. Here, note that in this second embodiment, a detailed explanation of substantially the same construction and substantially the same control processing as in the above-mentioned first embodiment will be omitted.

Figure 12:
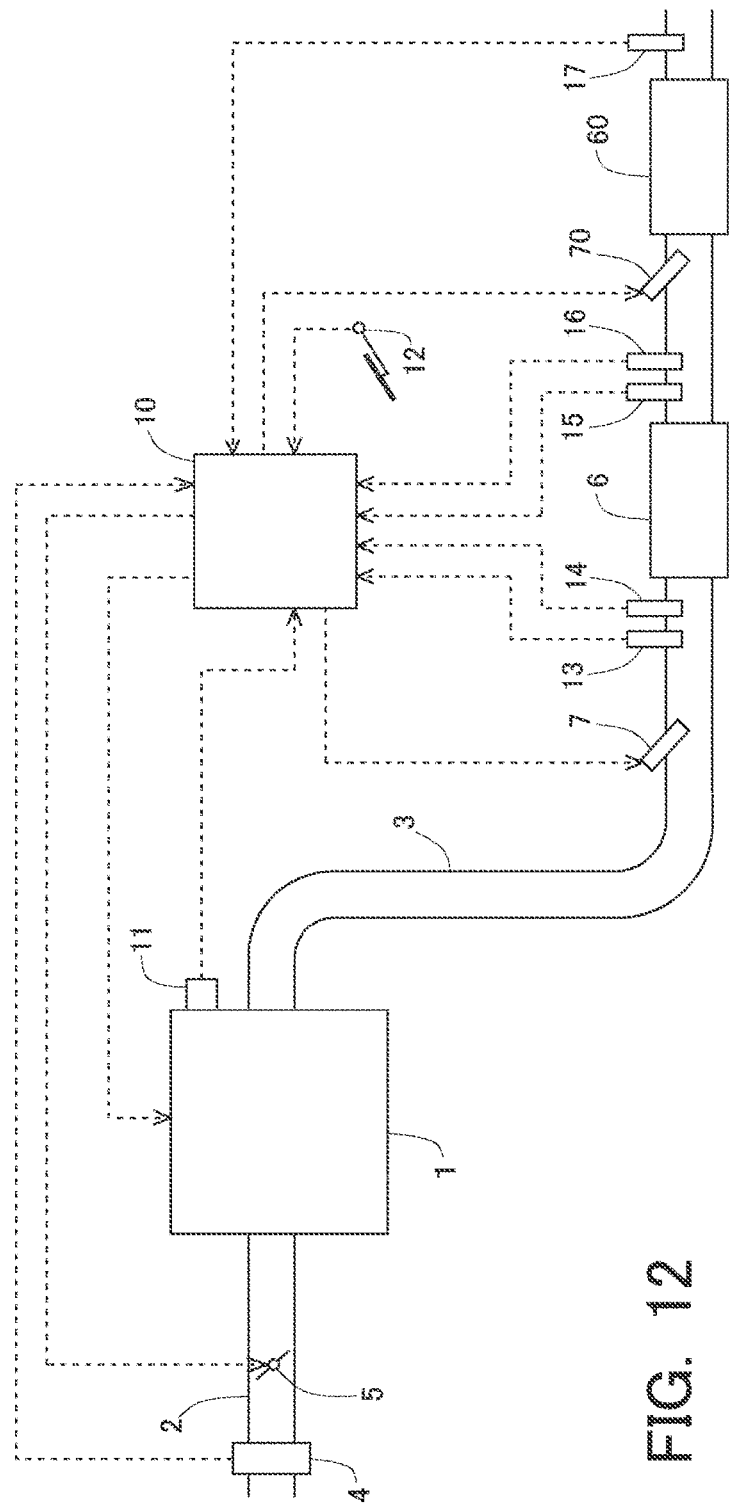
FIG. 12 is a view indicating the schematic construction of an intake system and an exhaust system of an internal combustion engine according to a second embodiment of the present disclosure.

FIG. 12 is a view indicating the schematic construction of an intake system and an exhaust system of an internal combustion engine according to this second embodiment of the present disclosure. In an exhaust passage 3 of the internal combustion engine 1 according to this second embodiment, there is arranged a second NOx storage reduction catalyst 60 (hereinafter, sometimes also referred to as a second NSR catalyst 60) in place of the above-mentioned SCR catalyst 8 indicated in FIG. 1. In other words, two NOx storage reduction catalysts will be arranged in the exhaust passage 3. An NOx storage reduction catalyst at the upstream side is the first NSR catalyst 6, and an NOx storage reduction catalyst at the downstream side is the second NSR catalyst 60. Then, in the exhaust passage 3 between the first NSR catalyst 6 and the second NSR catalyst 60, there is arranged a downstream side fuel addition valve 70 in place of the above-mentioned urea water addition valve 9 indicated in the FIG. 1. The downstream side fuel addition valve 70 serves to add fuel into an exhaust gas, so that the fuel thus added is supplied to the second NSR catalyst 60 together with the exhaust gas. Here, note that in this second embodiment, the downstream side fuel addition valve 70 corresponds to a reducing agent supply device in the present disclosure.

In such an exhaust gas purification apparatus, the ECU 10 carries out first rich spike processing to temporarily change the air fuel ratio of the exhaust gas flowing into the first NSR catalyst 6 from a lean air fuel ratio higher than a stoichiometric air fuel ratio to a rich air fuel ratio lower than the stoichiometric air fuel ratio. In addition, the ECU 10 carries out second rich spike processing to temporarily change the air fuel ratio of the exhaust gas flowing into the second NSR catalyst 60 from a lean air fuel ratio higher than the stoichiometric air fuel ratio to a rich air fuel ratio lower than the stoichiometric air fuel ratio. Here, the ECU 10 can carry out control to supply fuel to the second NSR catalyst 60 with the use of the downstream side fuel addition valve 70 (hereinafter, sometimes also referred to as "fuel supply control"). Then, the ECU 10 can carry out the second rich spike processing by carrying out the fuel supply control.

Then, the ECU 10 carries out the fuel supply control according to the first rich spike processing, whereby the air fuel ratio of the exhaust gas flowing into the second NSR catalyst 60 is temporarily made to the rich air fuel ratio. In other words, the ECU 10 carries out the second rich spike processing according to the first rich spike processing. With this, the NOx purged from the first NSR catalyst 6 by the first rich spike processing can be reduced by the second rich spike processing. Here, note that in this second embodiment, the second rich spike processing is carried out simultaneously with the execution of the first rich spike processing.

Further, in cases where the storage amount of NOx is the same, as for the ECU 10, the amount of fuel supply in the fuel supply control carried out according to the first rich spike processing is made larger, as the catalyst low temperature period becomes longer. In other words, in cases where the storage amount of NOx is the same, the ECU 10 makes the degree of richness of the rich air fuel ratio achieved by the execution of the second rich spike processing carried out according to the first rich spike processing larger, as the catalyst low temperature period becomes longer. As a result of this, even if the amount of purged NOx increases as the catalyst low temperature period becomes longer, the NOx purged from the first NSR catalyst 6 can be reduced in an appropriate manner, thus making it possible to suppress as much as possible a situation where exhaust emissions deteriorate. Here, note that in this second embodiment, the ECU 10 makes the amount of fuel supply larger as mentioned above, whereby the supply amount control is carried out.

Here, a control flow or routine carried out in this second embodiment will be described based on FIG. 13. FIG. 13 is a flow chart indicating the control flow or routine according to this second embodiment. In this second embodiment, this routine is carried out at a predetermined operation interval or period Δt in a repeated manner by the ECU 10 during the operation of the internal combustion engine 1. Here, note that in respective processings indicated in FIG. 13, the same reference signs are attached to the substantially same processings as those indicated in the above-mentioned FIG. 7, and the detailed explanation thereof is omitted.

Figure 13:
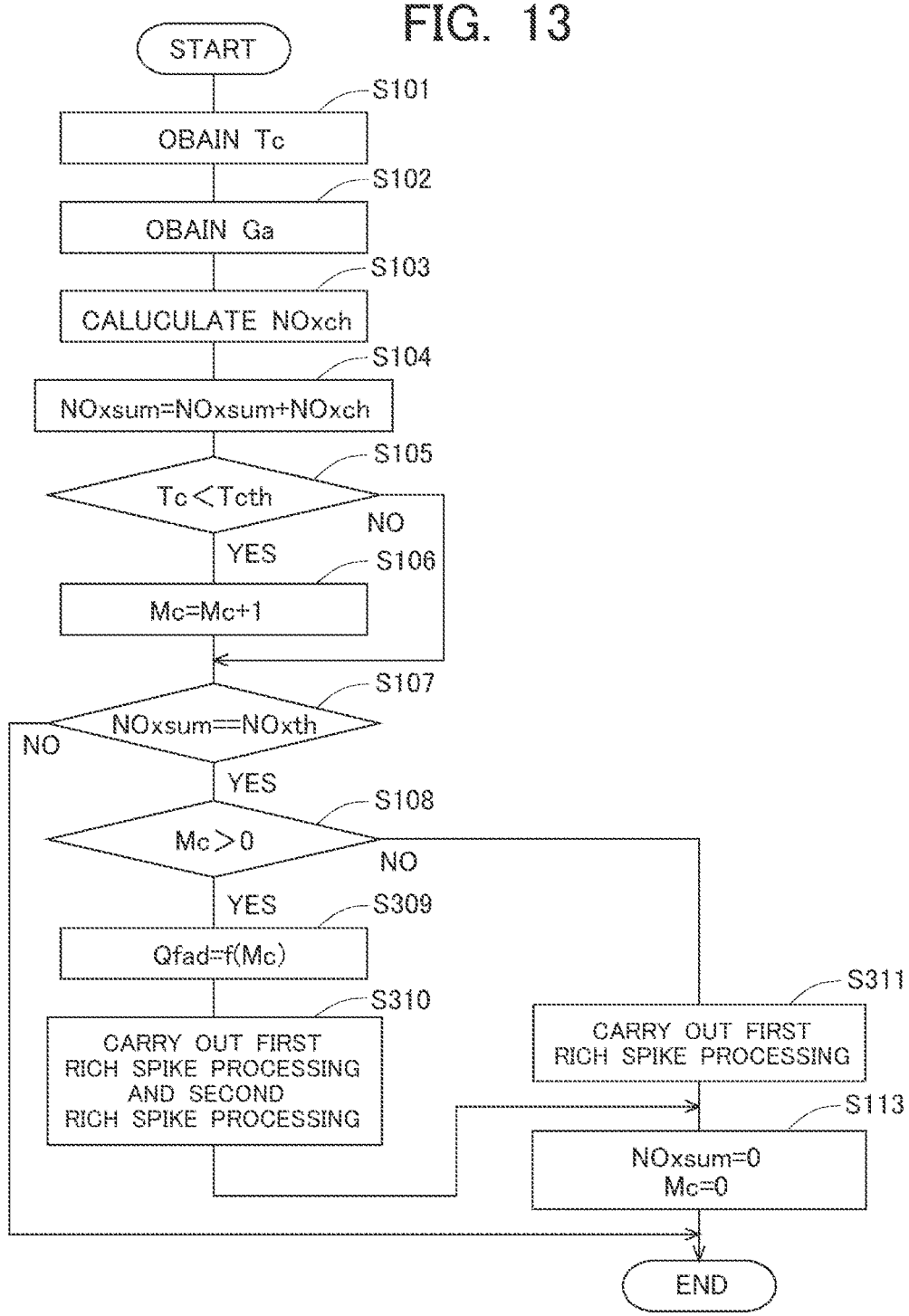
FIG. 13 is a flow chart indicating a control flow according to the second embodiment of the present disclosure.
Figure 14:
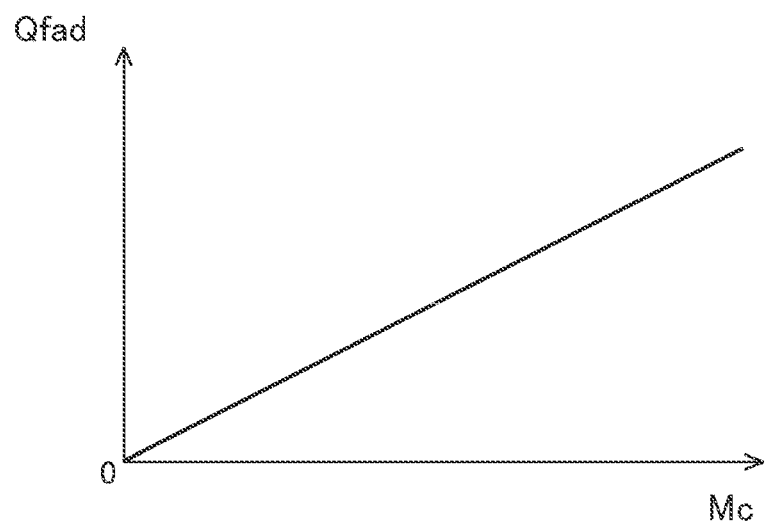
FIG. 14 is a view indicating a correlation between a set value of fuel supply amount and a low temperature counter.

In the control flow indicated in FIG. 13, in cases where an affirmative determination is made in step S108, then in step S309, the set value of fuel supply amount Qfad is calculated. Here, the set value of fuel supply amount Qfad is a set value of the amount of supply of fuel supplied from the downstream side fuel addition valve 70 by the second rich spike processing carried out according to the first rich spike processing. In step S309, the set value of fuel supply amount Qfad is calculated based on the value of the low temperature counter Mc. Specifically, the set value of fuel supply amount Qfad and the value of the low temperature counter Mc have a correlation with each other as indicated in FIG. 14. Then, this correlation has been stored in advance in the ROM of the ECU 10 as a function or a map, and in step S309, the set value of fuel supply amount Qfad is calculated based on the correlation and the value of the low temperature counter Mc counted in step S106. When the value of the low temperature counter Mc is 0, the set value of fuel supply amount Qfad calculated in this manner becomes 0, as indicated in FIG. 14. Then, the set value of fuel supply amount Qfad is made larger as the value of the low temperature counter Mc becomes larger from 0. In other words, in cases where the storage amount of NOx NOxsum is a reference amount NOxth, the set value of fuel supply amount Qfad is made larger as the catalyst low temperature period is longer.

Then, after the processing of step S309, the first rich spike processing and the second rich spike processing are carried out at the same time in step S310. Thereafter, after the processing of step S310, the routine of the ECU 10 goes to the processing of step S113.

In addition, in cases where a negative determination is made in step S108, then in step S311, the first rich spike processing is carried out. Thereafter, after the processing of step S311, the routine of the ECU 10 goes to the processing of step S113.

By the execution of the above-mentioned control flow or routine by means of the ECU 10, the NOx purged from the first NSR catalyst 6 by the first rich spike processing can be reduced in an appropriate manner by the second rich spike processing, thus making it possible to suppress as much as possible a situation where exhaust emissions deteriorate.

Third Embodiment

Next, reference will be made to a third embodiment of the present disclosure based on FIG. 15. Here, note that in this third embodiment, a detailed explanation of substantially the same construction and substantially the same control processing as in the above-mentioned first embodiment will be omitted.

In this third embodiment, the ECU 10 calculates an amount of nitrates stored in the first NSR catalyst 6 (hereinafter, sometimes also referred to as a "storage amount of nitrates") based on the NSR catalyst temperature. Here, a ratio of the storage amount of nitrates with respect to the storage amount of NOx is defined as a nitrate ratio, and a predetermined determination ratio is defined as a ratio at which the NOx purged from the first NSR catalyst 6 by rich spike processing becomes extremely small, when the nitrate ratio becomes equal to or higher than the predetermined determination ratio. In that case, in cases where the nitrate ratio is less than the predetermined determination ratio at the time the execution of the rich spike processing is required, when current rich spike processing is carried out, a part of the stored NOx will be purged from the first NSR catalyst 6. Then, in this case, even if the storage amount of NOx is the same, when the rich spike processing is carried out in a state where the nitrate ratio is low, the amount of purged NOx becomes larger, in comparison with when the rich spike processing is carried out in a state where the nitrate ratio is high. Accordingly, in cases where the nitrate ratio is less than the predetermined determination ratio when the execution of the rich spike processing is requested, supply control is carried out according to the rich spike processing, and the amount of supply of the reducing agent in the supply control is controlled based on the nitrate ratio. Specifically, the ECU 10 can control such that even if the storage amount of NOx is the same, the amount of supply of the reducing agent in the supply control carried out according to the rich spike processing is made larger in the case where the nitrate ratio is low than in the case where it is high. As a result of this, even in the case where the rich spike processing is carried out in the state where the nitrate ratio is low, the NOx purged from the first NSR catalyst 6 by the rich spike processing can be reduced, as in the case where the rich spike processing is carried out in the state where the nitrate ratio is high.

Here, a control flow or routine carried out in this third embodiment will be described based on FIG. 15. FIG. 15 is a flow chart indicating the control flow or routine according to this third embodiment. In this third embodiment, this routine is carried out at a predetermined operation interval or period Δt in a repeated manner by the ECU 10 during the operation of the internal combustion engine 1. Here, note that in respective processings indicated in FIG. 15, the same reference signs are attached to the substantially same processings as those indicated in the above-mentioned FIG. 7, and the detailed explanation thereof is omitted.

Figure 15:
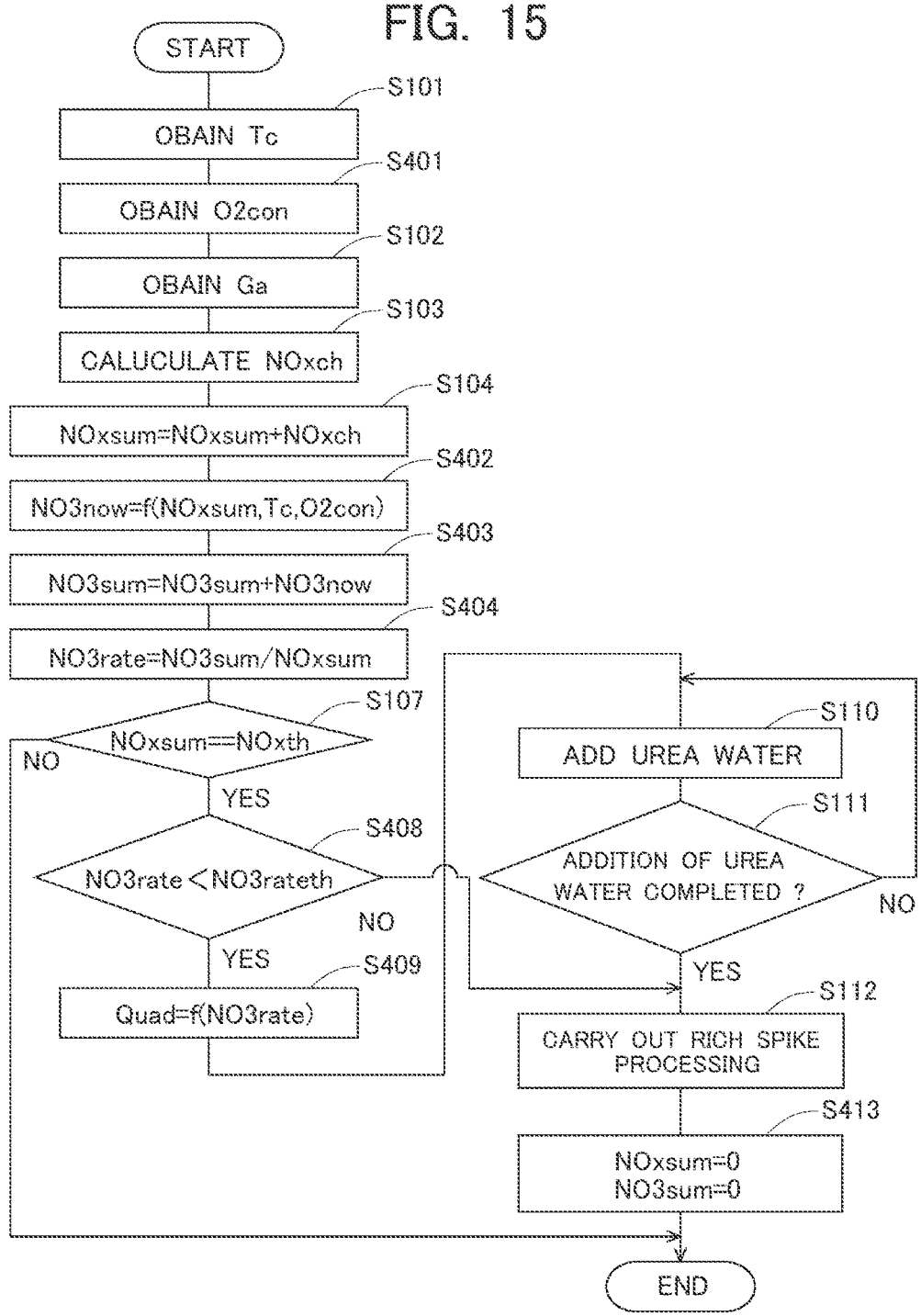
FIG. 15 is a flow chart indicating a control flow according to a third embodiment of the present disclosure.

In the control flow indicated in FIG. 15, after the processing of step S101, an oxygen concentration O2con of an incoming exhaust gas is obtained in step S401. In step S401, the oxygen concentration O2con of the incoming exhaust gas is calculated based on the output value of the air fuel ratio sensor 14. Then, after the processing of step S401, the routine of the ECU 10 goes to the processing of step S102.

In addition, in the control flow indicated in FIG. 15, in step S402 after the processing of step S104, an amount of production of nitrates (hereinafter, sometimes also referred to as a "current production amount") NO3now to be produced in a current state of the first NSR catalyst 6 (i.e., the storage amount of NOx, the NSR catalyst temperature and the oxygen concentration) is calculated. In step S402, a production rate of nitrates is calculated based on the storage amount of NOx NOxsum calculated in step S104, the NSR catalyst temperature Tc obtained in step S101, and the oxygen concentration O2con of the incoming exhaust gas obtained in step S401. This production rate of nitrates is calculated by the following expression 1.

$$NO3reac = A \cdot \exp\left(-\frac{Ea}{R \cdot Tc}\right) \times NO2sum^a \times O2con^b \qquad \text{Expression 1}$$

NO3reac: the production rate of nitrates,
Tc: the NSR catalyst temperature,
NO2sum: the storage amount of nitrites,
O2con: the oxygen concentration,
R: a gas constant, and
A, Ea, a, b: empirical constants.

Then, the current production amount NO3now is calculated by multiplying the production rate of nitrates NO3reac by the operation period Δt.

Here, the storage amount of nitrites NO2sum is an amount of the nitrites stored in the first NSR catalyst 6, and is calculated by the following expression 2.

NO2sum=NO2old+NOx*ch*      Expression 2

NO2sum: the storage amount of nitrites,
NO2old: the last storage amount of nitrites, and
NOxch: an amount of change In other words, the NOx having flowed into the first NSR catalyst 6 can once turn into nitrites and can be stored into the first NSR catalyst 6, so the change of NOx in the first NSR catalyst 6 until the present time after this routine was carried out last time is all assumed to be the change of nitrites. Then, the storage amount of nitrites NO2sum is calculated by adding the last amount of nitrites stored in the first NSR catalyst 6 to the amount of change NOxch.

Subsequently, in step S403, the storage amount of nitrates NO3sum is calculated. In step S403, the storage amount of nitrates NO3sum is calculated by adding the current production amount NO3now calculated in step S402 to the storage amount of nitrates NO3sum.

Then, in step S404, the nitrate ratio NO3rate is calculated. In step S404, the nitrate ratio NO3rate is calculated by dividing the storage amount of nitrates NO3sum calculated in step S403 by the storage amount of NOx NOxsum calculated in step S104. Then, after the processing of step S404, the routine of the ECU 10 goes to the processing of step S107.

Thereafter, in cases where an affirmative determination is made in step S107, then in step S408, it is determined whether the nitrate ratio NO3rate calculated in step S404 is less than a determination ratio NO3rateth. Here, the determination ratio NO3rateth is as mentioned above. Then, in cases where an affirmative determination is made in step S408, the routine of the ECU 10 goes to the processing of step S409. On the other hand, in cases where a negative determination is made in step S408, the routine of the ECU 10 goes to the processing of step S112.

In cases where an affirmative determination is made in step S408, then in step S409, the urea water addition amount set value Quad is calculated. In step S409, the urea water addition amount set value Quad is calculated based on the nitrate ratio NO3rate calculated in step S404. Specifically, in cases where the storage amount of NOx NOxsum is the reference amount NOxth, the urea water addition amount set value Quad is made larger in the case where the nitrate ratio NO3rate is low than in the case where it is high. Then, after the processing of step S409, the routine of the ECU 10 goes to the processing of step S110.

Subsequently, after the processing of step S112, the storage amount of NOx NOxsum and the storage amount of nitrates NO3sum are initialized to 0 in step S413. Then, after the processing of step S413, the execution of this routine is ended.

By the execution of the above-mentioned control flow or routine by means of the ECU 10, NOx is reduced in an appropriate manner in the SCR catalyst 8, thus making it possible to suppress as much as possible a situation where exhaust emissions deteriorate.

What is claimed is:
1. An exhaust gas purification apparatus for an internal combustion engine which performs lean burn operation, the apparatus comprising:
a first NOx storage reduction catalyst that is arranged in an exhaust passage of the internal combustion engine;
a post-stage catalyst that is arranged in the exhaust passage at the downstream side of the first NOx storage reduction catalyst, and reduces NOx in an exhaust gas by a supplied reducing agent;
a reducing agent supply device that is arranged in the exhaust passage between the first NOx storage reduction catalyst and the post-stage catalyst, and supplies the reducing agent into the exhaust passage;
a controller comprising at least one processor is configured to carry out rich spike to temporarily change an air fuel ratio of an exhaust gas flowing into the first NOx storage reduction catalyst from a lean air fuel ratio higher than a stoichiometric air fuel ratio into a rich air fuel ratio lower than the stoichiometric air fuel ratio; wherein the controller carries out supply control to supply the reducing agent to the post-stage catalyst by using the reducing agent supply device, wherein in cases where a temperature of the first NOx storage reduction catalyst becomes less than a predetermined determination temperature in at least a part of a determination period of time from the completion of the execution of the last rich spike to a request for the execution of the current rich spike, the controller carries out the supply control according to the execution of the current rich spike; and the controller calculates a storage amount of NOx which is an amount of NOx stored in the first NOx storage reduction catalyst;

wherein in cases where the storage amount of NOx is the same, the controller carries out supply amount control to make an amount of supply of the reducing agent in the supply control larger as a period of time in which the temperature of the first NOx storage reduction catalyst is less than the predetermined determination temperature becomes longer.

2. The exhaust gas purification apparatus for an internal combustion engine as set forth in claim 1, wherein the post-stage catalyst is an NOx selective reduction catalyst that reduces the NOx in the exhaust gas by supplied ammonia;

the reducing agent supply device supplies a precursor of ammonia or ammonia; and in cases where the temperature of the first NOx storage reduction catalyst becomes less than the predetermined determination temperature in at least a part of the determination period of time from the completion of the execution of the last rich spike to the request for the execution of the current rich spike, the controller carries out the supply control before the current rich spike is carried out.

3. The exhaust gas purification apparatus for an internal combustion engine as set forth in claim 2, wherein the controller carries out the supply amount control so that the amount of adsorption of ammonia in the NOx selective reduction catalyst after the execution of the supply amount control becomes less than a slip development adsorption amount at which a slip of ammonia from the NOx selective reduction catalyst starts.

4. The exhaust gas purification apparatus for an internal combustion engine as set forth in claim 1, wherein the post-stage catalyst is a second NOx storage reduction catalyst that reduces the NOx in the exhaust gas by supplied fuel;

the reducing agent supply device supplies fuel; and in cases where the temperature of the first NOx storage reduction catalyst becomes less than the predetermined determination temperature in at least a part of the determination period of time from the completion of the execution of the last rich spike to the request for the execution of the current rich spike, the controller carries out the supply control simultaneously with the execution of the current rich spike.

5. An exhaust gas purification apparatus for an internal combustion engine which performs lean burn operation, the apparatus comprising:

a first NOx storage reduction catalyst that is arranged in an exhaust passage of the internal combustion engine;

a post-stage catalyst that is arranged in the exhaust passage at the downstream side of the first NOx storage reduction catalyst, and reduces NOx in an exhaust gas by a supplied reducing agent;

a reducing agent supply device that is arranged in the exhaust passage between the first NOx storage reduction catalyst and the post-stage catalyst, and supplies the reducing agent into the exhaust passage;

a controller comprising at least one processor is configured to carry out rich spike to temporarily change an air fuel ratio of an exhaust gas flowing into the first NOx storage reduction catalyst from a lean air fuel ratio higher than a stoichiometric air fuel ratio into a rich air fuel ratio lower than the stoichiometric air fuel ratio; wherein the controller carries out supply control to supply the reducing agent to the post-stage catalyst by using the reducing agent supply device;

the controller calculates a storage amount of NOx which is an amount of NOx stored in the first NOx storage reduction catalyst;

the controller calculates, based on a temperature of the first NOx storage reduction catalyst, a storage amount of nitrates which is an amount of nitrates stored in the first NOx storage reduction catalyst; and the controller calculates a nitrate ratio, which is a ratio of the storage amount of nitrates with respect to the storage amount of NOx, based on the storage amount of NOx and the storage amount of nitrates;

wherein in cases where the nitrate ratio is less than a predetermined determination ratio when the execution of the rich spike is requested, the controller carries out the supply control according to the execution of the rich spike, and controls an amount of supply of the reducing agent in the supply control based on the nitrate ratio.

* * * * *